US012623388B2

(12) United States Patent
Hotta et al.

(10) Patent No.: US 12,623,388 B2
(45) Date of Patent: May 12, 2026

(54) CONTROLLER OF INJECTION MOLDING MACHINE, INJECTION MOLDING MACHINE, AND PROGRAM

(71) Applicant: SUMITOMO HEAVY INDUSTRIES, LTD., Tokyo (JP)

(72) Inventors: Daigo Hotta, Chiba (JP); Takuya Mizunashi, Chiba (JP); Takasue Yamaguchi, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/818,478

(22) Filed: Aug. 9, 2022

(65) Prior Publication Data

US 2023/0050316 A1 Feb. 16, 2023

(30) Foreign Application Priority Data

Aug. 11, 2021 (JP) ................................. 2021-131362

(51) Int. Cl.
*B29C 45/76* (2006.01)

(52) U.S. Cl.
CPC .. *B29C 45/766* (2013.01); *B29C 2945/76939* (2013.01)

(58) Field of Classification Search
CPC ........ B29C 45/766; B29C 2945/76939; B29C 45/76; B29C 45/17
See application file for complete search history.

(56) References Cited

U.S. PATENT DOCUMENTS

| | | | |
|---|---|---|---|
| 5,173,223 A | 12/1992 | Kamiguchi et al. | |
| 2003/0082255 A1* | 5/2003 | Konishi .................. | B29C 45/76 |
| | | | 425/173 |
| 2004/0051194 A1 | 3/2004 | Yamazaki et al. | |

FOREIGN PATENT DOCUMENTS

| | | |
|---|---|---|
| JP | S59-217119 | 12/1984 |
| JP | H03-155915 | 7/1991 |
| JP | H06-297532 | 10/1994 |
| JP | H11-309767 | 11/1999 |
| JP | 2001-287254 | 10/2001 |
| JP | 2003-200456 | 7/2003 |
| JP | 2004-106272 | 4/2004 |
| JP | 2004-155065 | 6/2004 |
| JP | 2005-028894 | 2/2005 |
| JP | 2006-341501 | 12/2006 |
| JP | 2007-196604 | 8/2007 |
| JP | 2009-000929 | 1/2009 |

* cited by examiner

*Primary Examiner* — Alison L Hindenlang
*Assistant Examiner* — Shibin Liang
(74) *Attorney, Agent, or Firm* — IPUSA, PLLC

(57) ABSTRACT

A controller of an injection molding machine includes a receiving part configured to receive a selection of an injection molding process and a selection of an item that indicates either setting information indicative of a setting of the process or a performance value detected in the process, and an output part configured to output display information that graphically represents changes in the setting information or in the performance value based on the item preliminarily associated with the process for which the selection was received when the receiving part receives the selection of the process.

11 Claims, 12 Drawing Sheets

FIG.4

| PROCESS | ITEM 1 | MAXIMUM VALUE (ITEM 1) | MINIMUM VALUE (ITEM 1) | ITEM 2 | MAXIMUM VALUE (ITEM 2) | MINIMUM VALUE (ITEM 2) | ITEM 3 | MAXIMUM VALUE (ITEM 3) | MINIMUM VALUE (ITEM 3) | ⋮ |
|---|---|---|---|---|---|---|---|---|---|---|
| START FILLING | INJECTION VELOCITY SETTING | 100.00 | −100.00 | INJECTION VELOCITY DETECTION | 100.00 | −100.00 | PRESSURE-HOLDING SETTING | 200.00 | 0.00 | ⋮ |
| START CLOSING MOLD | CLOSED-MOLD POSITION DETECTION | 25.00 | 0.00 | CLOSED-MOLD VELOCITY DETECTION | 300.00 | −100.00 | CLAMPING FORCE DETECTION | 200.00 | −100.00 | ⋮ |
| ⋮ | ⋮ | ⋮ | ⋮ | ⋮ | ⋮ | ⋮ | ⋮ | ⋮ | ⋮ | ⋮ |

FIG.8

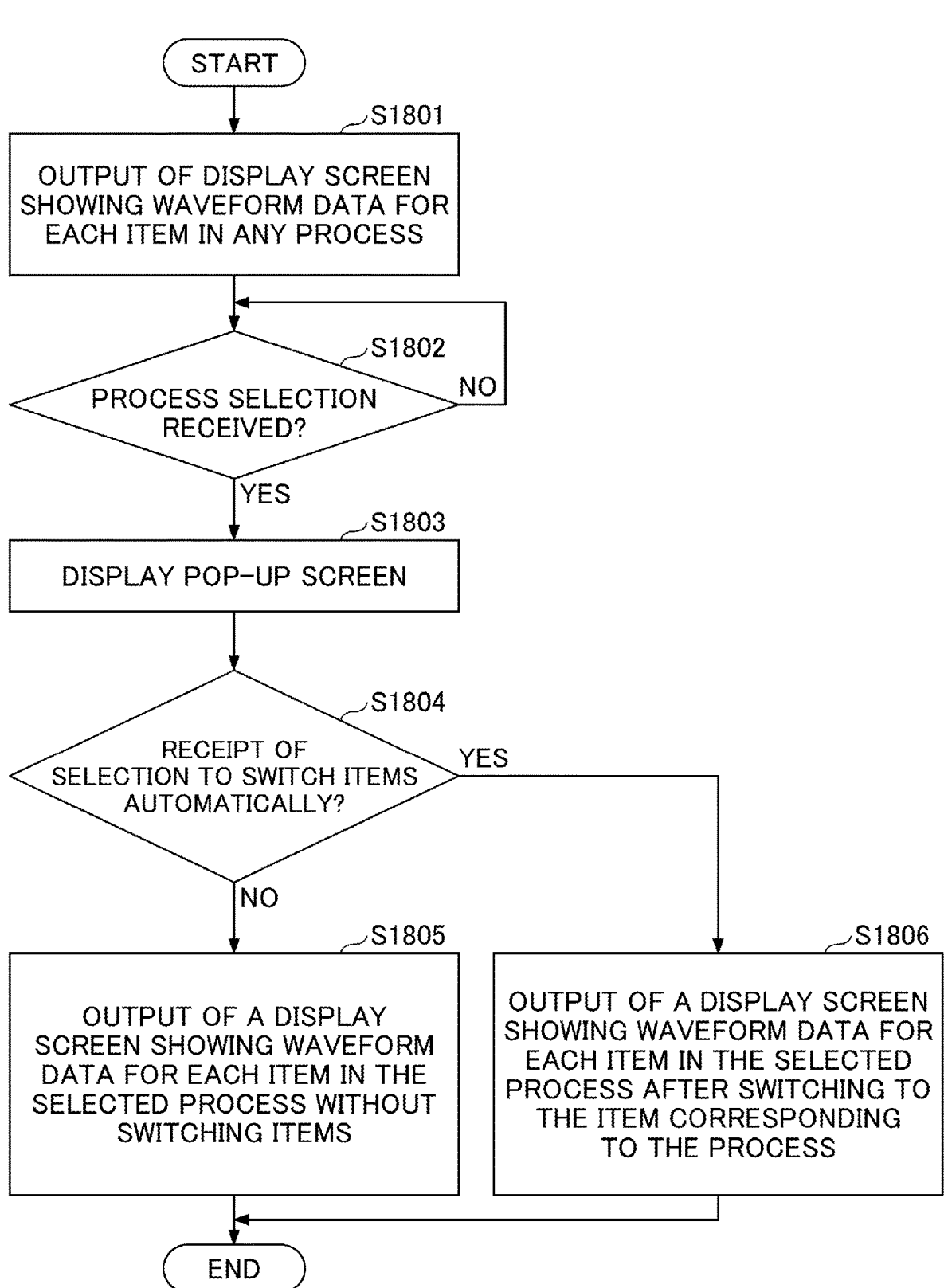

START

S1801

OUTPUT OF DISPLAY SCREEN SHOWING WAVEFORM DATA FOR EACH ITEM IN ANY PROCESS

S1802

PROCESS SELECTION RECEIVED?

NO

YES

S1803

DISPLAY POP-UP SCREEN

S1804

RECEIPT OF SELECTION TO SWITCH ITEMS AUTOMATICALLY?

YES

NO

S1805

OUTPUT OF A DISPLAY SCREEN SHOWING WAVEFORM DATA FOR EACH ITEM IN THE SELECTED PROCESS WITHOUT SWITCHING ITEMS

S1806

OUTPUT OF A DISPLAY SCREEN SHOWING WAVEFORM DATA FOR EACH ITEM IN THE SELECTED PROCESS AFTER SWITCHING TO THE ITEM CORRESPONDING TO THE PROCESS

END

CONTROLLER OF INJECTION MOLDING MACHINE, INJECTION MOLDING MACHINE, AND PROGRAM

CROSS-REFERENCE TO RELATED APPLICATIONS

The present application is based on and claims priority under 35 U.S.C. 119 to Patent Application No. 2021-131362 filed on Aug. 11, 2021 with the Japan Patent Office, and the entire contents of Japanese Patent Application No. 2021-131362 are hereby incorporated by reference.

BACKGROUND OF THE INVENTION

1. Field of the Invention

The present invention relates to a controller of an injection molding machine, an injection molding machine, and a program.

2. Description of the Related Art

Conventionally, various sensors are provided in an injection molding machine. Therefore, in an injection molding machine, there has been proposed a technique for displaying waveform data in which the results of various operations during injection molding based on a detection signal from a sensor or the setting information by a user is represented by a waveform on a display.

In recent years, various techniques have been proposed for displaying waveform data on a display of an injection molding machine. For example, conventionally, a technique is proposed in which a scale is displayed for each of a plurality of items when waveform data indicating detection results is displayed, so that the injection molding machine functions as a measuring instrument.

SUMMARY

A controller of an injection molding machine includes a receiving part configured to receive a selection of an injection molding process and a selection of an item that indicates either setting information indicative of a setting of the process or a performance value detected in the process, and an output part configured to output display information that graphically represents changes in the setting information or in the performance value based on the item preliminarily associated with the process for which the selection was received when the receiving part receives the selection of the process.

BRIEF DESCRIPTION OF DRAWINGS

FIG. 4 is a diagram illustrating a table structure of a process correspondence information storage part according to the first embodiment;

FIG. 8 is a flowchart illustrating a control performed when a selection of the process is received in the controller according to the first embodiment;

DETAILED DESCRIPTION OF THE INVENTION

Figure 1:
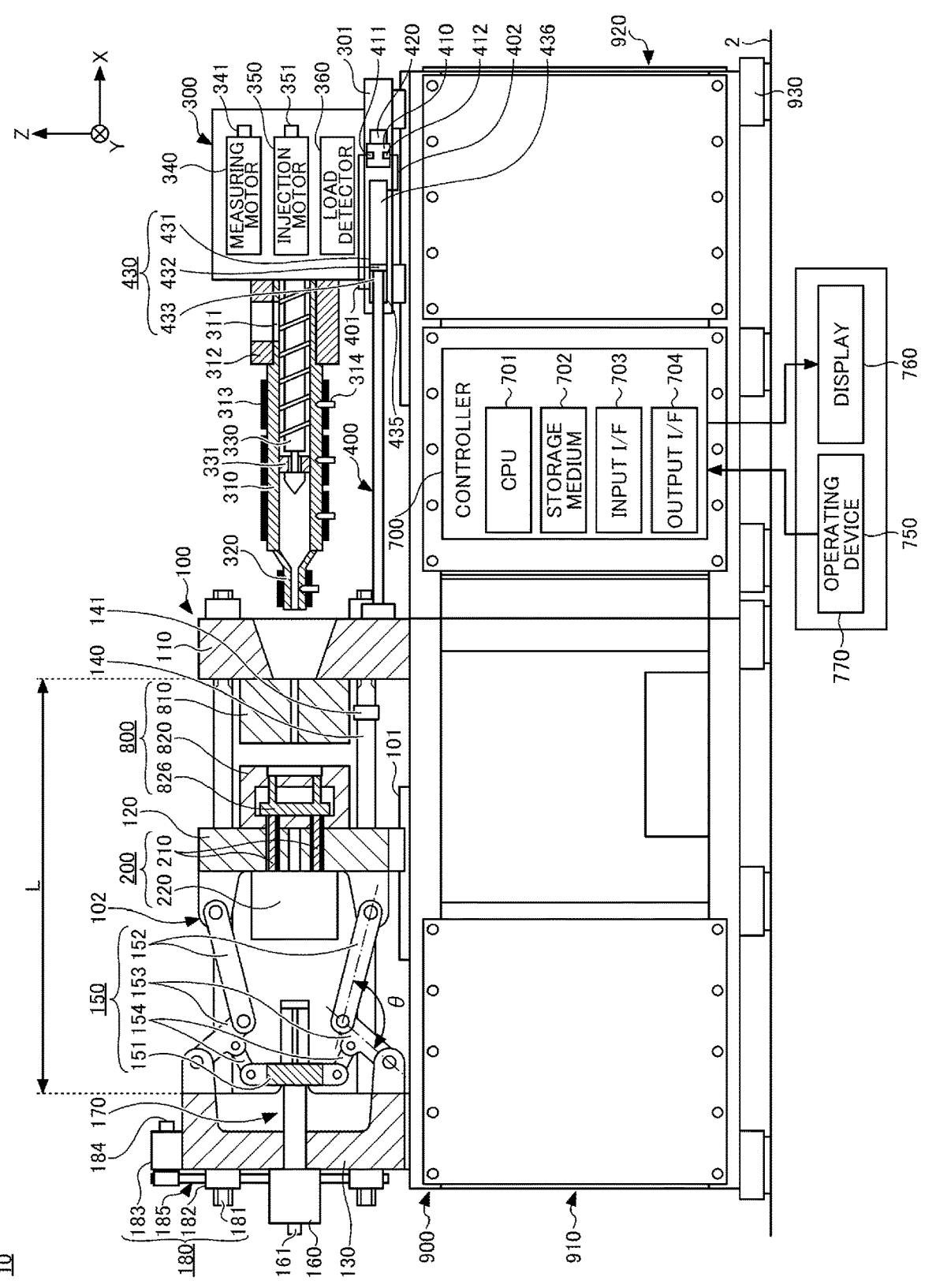
FIG. 1 illustrates a state of an injection molding machine according to a first embodiment when opening of a mold is completed.

With conventional techniques, items to be displayed and the like are preset for each process. However, the items that users want to display often vary depending on the situation. For this reason, technologies that allow users to select items to be displayed have also been proposed.

However, if items to be displayed for each process are selectable, the user must select the item to be displayed from multiple items each time the process is switched. The large number of selectable items makes the operations required when switching processes complicated and places a heavy operational burden on the user.

One aspect of the present invention provides technology to reduce the burden of operation when switching the display of processes in an injection molding machine.

According to one aspect of the invention, the user's operational burden is reduced by automatically switching to an item that corresponds to a process.

Hereinafter, an embodiment of the invention will be described with reference to drawings. In each drawing, the same or corresponding reference numerals are assigned to the same or corresponding configurations, and descriptions thereof are omitted.

Figure 2:
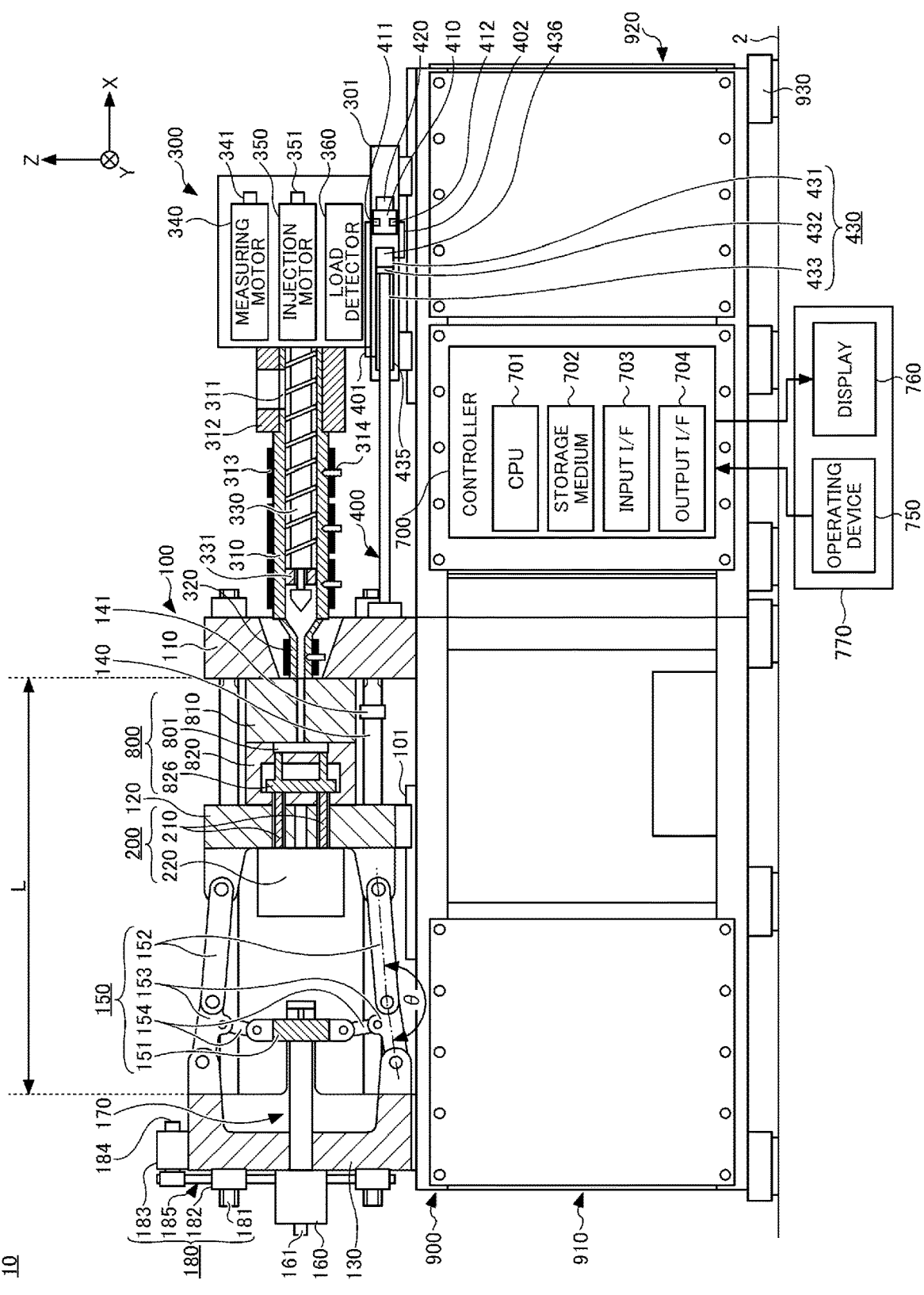
FIG. 2 illustrates a state of the injection molding machine according to the first embodiment when the mold is clamped.

FIG. 1 is a view illustrating a state when a mold opening of an injection molding machine according to a first embodiment is completed. FIG. 2 is a view illustrating a state when a mold of the injection molding machine according to the first embodiment is clamped. In this specification, an X-axis direction, a Y-axis direction, and a Z-axis direction are directions perpendicular to each other. The X-axis direction and the Y-axis direction represent a horizontal direction, and the Z-axis direction represents a vertical direction. When a mold clamping device 100 is a horizontal type, the X-axis direction is a mold opening and closing direction and the Y-axis direction is a width direction of an injection molding machine 10. A negative side in the Y-axis direction is referred to as an operation side, and a positive side in the Y-axis direction is referred to as a non-operation side.

As illustrated in FIGS. 1 and 2, the injection molding machine 10 includes a mold clamping device 100 that opens and closes a mold device 800, an ejector device 200 that ejects a molded article molded by the mold device 800, an injection device 300 that injects a molding material into the mold device 800, a moving device 400 that moves the injection device 300 forward and backward against the mold device 800, a controller 700 that controls each component of the injection molding machine 10, and a frame 900 that supports each component of the injection molding machine 10. The frame 900 includes a mold clamping device frame 910 supporting the mold clamping device 100 and an injection device frame 920 supporting the injection device 300. The mold clamping device frame 910 and the injection device frame 920 are respectively installed on the floor 2 via a leveling adjuster 930. The controller 700 is placed in the internal space of the injector device frame 920. Each component of the injection molding machine 10 is described below.

(Mold Clamping Device)

In descriptions of the mold clamping device 100, a movement direction (for example, X-axis positive direction) of a movable platen 120 at the time of mold closing is defined as a front side, and a movement direction (for example, X-axis negative direction) of the movable platen 120 at the time of mold opening is defined as a rear side.

The mold clamping device 100 performs mold closing, pressure-boosting, mold clamping, depressurizing, and mold opening of a mold device 800. The mold device 800 includes a fixed mold 810 and a movable mold 820. The mold clamping device 100 is horizontal, for example, and the mold opening and closing direction is horizontal. The mold clamping device 100 has a fixed platen 110 to which a fixed mold 810 is attached, the movable platen 120 to which the movable mold 820 is attached, and a moving mechanism 102 for moving the movable platen 120 in the mold opening and closing direction relative to the fixed platen 110.

The fixed platen 110 is fixed to the mold clamping device frame 910. The fixed mold 810 is attached to the surface of the fixed platen 110 facing the movable platen 120.

The movable platen 120 is freely arranged in the mold opening and closing direction with respect to the mold clamping device frame 910. On the mold clamping device frame 910, a guide 101 is laid to guide the movable platen 120. The movable mold 820 is attached to the surface of movable platen 120 facing the fixed platen 110.

The moving mechanism 102 moves the movable platen 120 forward and backward against the fixed platen 110 to close, pressure-boost, clamp, depressurize, and open the mold device 800. The moving mechanism 102 has a toggle support 130 spaced apart from the fixed platen 110, a tie bar 140 connecting the fixed platen 110 and the toggle support 130, a toggle mechanism 150 for moving the movable platen 120 in the mold opening and closing direction with respect to the toggle support 130, a mold clamping motor 160 for operating the toggle mechanism 150, a motion conversion mechanism 170 for converting the rotational motion of the mold clamping motor 160 into linear motion, and a mold thickness adjustment mechanism 180 for adjusting the spacing between the fixed platen 110 and the toggle support 130.

The toggle support 130 is spaced from the fixed platen 110 and mounted on the mold clamping device frame 910 so as to move freely in the mold opening and closing direction. The toggle support 130 may be movably arranged along a guide laid on the mold clamping device frame 910. The guide of the toggle support 130 may be the same as the guide 101 of the movable platen 120.

In the present embodiment, the fixed platen 110 is fixed to the mold clamping device frame 910 and the toggle support 130 is arranged freely in the mold opening and closing direction with respect to the mold clamping device frame 910, but the toggle support 130 may be fixed to the mold clamping device frame 910 and the fixed platen 110 may be arranged freely in the mold opening and closing direction with respect to the mold clamping device frame 910.

The tie bar 140 connects the fixed platen 110 and the toggle support 130 with an interval L in the mold opening and closing direction. Multiple tie bars 140 (for example, 4) may be used. The multiple tie bars 140 are arranged parallel to the mold opening and closing direction and extend according to the clamp force. At least one tie bar 140 may be provided with a tie bar strain detector 141 that detects strain in the tie bar 140. The tie bar strain detector 141 sends a signal indicating its detection result to the controller 700. The detection result of the tie bar strain detector 141 is used for the detection of clamp force or the like.

In the present embodiment, the tie bar strain detector 141 is used as the mold clamping force detector for detecting the clamp force, but the present invention is not limited to this. The clamping force detector is not limited to the strain gauge type, but may be piezoelectric, capacitive, hydraulic, electromagnetic, or the like, and its mounting position is not limited to the tie bar 140.

A toggle mechanism 150 is positioned between the movable platen 120 and the toggle support 130 to move the movable platen 120 relative to the toggle support 130 in the mold opening and closing direction. The toggle mechanism 150 has a crosshead 151 that moves in the mold opening and closing direction and a pair of link groups that bend and stretch by the movement of the crosshead 151. The pair of link groups have, respectively, a first link 152 and a second link 153 flexibly connected by pins or the like. The first link 152 is swingably attached to the movable platen 120 by a pin or the like. The second link 153 is swingably attached to the toggle support 130 by a pin or the like. The second link 153 is attached to the crosshead 151 via the third link 154. When the crosshead 151 is moved forward and backward against the toggle support 130, the first link 152 and the second link 153 are bent and stretched, and the movable platen 120 moves forward and backward against the toggle support 130.

The configuration of the toggle mechanism 150 is not limited to the configuration illustrated in FIGS. 1 and 2. For example, in FIGS. 1 and 2, the number of nodes in each link group is 5, but it may be 4, and one end of the third link 154 may be connected to the nodes of the first link 152 and the second link 15.

A mold clamping motor 160 is attached to the toggle support 130 to operate the toggle mechanism 150. The mold clamping motor 160 bends and stretches the first link 152 and the second link 153 by moving the crosshead 151 forward and backward against the toggle support 130, and moves the movable platen 120 forward and backward against the toggle support 130. The mold clamping motor 160 is directly connected to the motion conversion mechanism 170, but may be connected to the motion conversion mechanism 170 via a belt, pulley, and the like.

The motion conversion mechanism 170 converts the rotational motion of the mold clamping motor 160 into the linear motion of the crosshead 151. The motion conversion mechanism 170 includes a screw shaft and a screw nut that screws into the screw shaft. A ball or roller may be interposed between the screw shaft and the screw nut.

The mold clamping device 100 performs a mold closing process, a pressure-boosting process, a mold clamping process, a depressurizing process, a mold opening process, and the like under the control of the controller 700.

In the mold closing process, the mold clamping motor 160 is driven to move the crosshead 151 forward to the mold closing completion position at a set moving velocity, thereby forwarding the movable platen 120 and touching the movable mold 820 to the fixed mold 810. The position and moving velocity of the crosshead 151 are detected using, for example, a mold clamping motor encoder 161. The mold clamping motor encoder 161 detects the rotation of the mold clamping motor 160 and sends a signal indicating the result of the detection to the controller 700.

The crosshead position detector for detecting the position of the crosshead 151 and the crosshead moving velocity detector for detecting the moving velocity of the crosshead 151 are not limited to the mold clamping motor encoder 161, but general position detectors can be used. The movable platen position detector for detecting the position of the movable platen 120 and the movable platen moving velocity detector for detecting the moving velocity of the movable platen 120 are not limited to the mold clamping motor encoder 161, and general velocity detectors can be used.

In the pressure-boosting process, the mold clamping force is generated by further driving the mold clamping motor 160 to further move the crosshead 151 forward from the mold closing clamping position to the mold open clamping position.

In the mold clamping process, the mold clamping motor 160 is driven to maintain the position of the crosshead 151 in the mold clamping position. In the mold clamping process, the mold clamping force generated in the pressure-boosting process is maintained. In the mold clamping process, a cavity space 801 (see FIG. 2) is formed between the movable mold 820 and the fixed mold 810, and an injection device 300 fills the cavity space 801 with a liquid molding material. The filled molding material is solidified, resulting in a molded product.

The number of cavity spaces 801 may be one or more. In the latter case, several molded products are obtained simultaneously. An insert material may be placed in one part of the cavity space 801 and the other part of the cavity space 801 may be filled with a molding material. A molded product is obtained in which the insert material and the molding material are integrated.

In the depressurization process, the mold clamping motor 160 is driven to move the crosshead 151 backward from the mold closing clamping position to the mold opening starting position, thereby moving the movable platen 120 backward and reducing the mold clamping force. The mold opening start position and the mold closing completion position may be the same position.

In the mold opening process, the mold clamping motor 160 is driven to move the crosshead 151 backward from the mold opening start position to the mold opening completion position at a set moving velocity, thereby moving the movable platen 120 backward and separating the movable mold 820 from the fixed mold 810. An ejector device 200 then ejects the molded product from the movable mold 820.

The setting conditions in the mold closing, pressure-boosting, and clamping processes are collectively set as a series of setting conditions. For example, the moving velocity and position (includes mold closing starting position, moving velocity switching position, mold closing completion position, and mold clamping closing position) of the crosshead 151 and the mold clamping force in the mold closing and pressure-boosting processes are collectively set as a series of setting conditions. The mold closing starting position, the moving velocity switching position, the mold closing completion position, and the mold clamping position are arranged in this order from the rear side to the front side and represent the start and end points of the section where the moving velocity is set. For each section, a moving velocity is set. The moving velocity switching position may be one or more. The moving velocity switching position need not be set. Only one of the mold clamping position and the mold clamping force may be set.

Setting conditions in the depressurization process and mold opening process are similarly set. For example, the moving velocity and position (mold opening start position, moving velocity switching position, and mold opening completion position) of the crosshead 151 in the depressurization and mold opening processes are collectively set as a series of setting conditions. The mold opening start position, the moving velocity switching position, and the mold opening completion position are arranged in this order from the front to the rear and represent the start and end points of the section where the moving velocity is set. For each section, a moving velocity is set. The moving velocity switching position may be one or more. The moving velocity switching position need not be set. The mold opening start position and the mold closing completion position may be at the same position. The mold opening completion position and the mold closing start position may be the same.

The moving velocity and position of the movable platen 120 may be set instead of the moving velocity and position of the crosshead 151. The mold clamping force may also be set instead of the position of the crosshead (for example, mold clamping position) or the position of the movable platen.

The toggle mechanism 150 amplifies the driving force of the mold clamping motor 160 and transmits the force to the movable platen 120. That amplification factor is also called toggle magnification. The toggle magnification varies according to the angle $\theta$ (hereinafter also referred to as "link angle $\theta$") formed by the first link 152 and the second link 153. The link angle $\theta$ is obtained from the position of the crosshead 151. The toggle magnification is maximum when the link angle $\theta$ is 180 degrees.

When the thickness of the mold device 800 changes due to the replacement of the mold device 800 or a change in the temperature of the mold device 800, the mold thickness is adjusted so that a prescribed clamping force is obtained when the mold is clamped. In mold thickness adjustment, the interval L between the fixed platen 110 and the toggle support 130 is adjusted so that the link angle $\theta$ of the toggle mechanism 150 becomes a predetermined angle at the time of mold touch, for example, when the movable mold 820 touches the fixed mold 810.

The mold clamping device 100 has a mold thickness adjustment mechanism 180. The mold thickness adjustment mechanism 180 adjusts the interval L between the fixed platen 110 and the toggle support 130 to adjust the mold thickness. The timing of the mold thickness adjustment is performed, for example, between the end of the molding cycle and the start of the next molding cycle. The mold thickness adjustment mechanism 180 has, for example, a screw shaft 181 formed at the rear end of the tie bar 140, a screw nut 182 held rotatably and non-movably in the forward and backward direction by the toggle support 130, and a mold thickness adjustment motor 183 for rotating the screw nut 182 screwed to the screw shaft 181.

The screw shaft 181 and the screw nut 182 are provided for each tie bar 140. The rotary driving force of the mold thickness adjustment motor 183 may be transmitted to the multiple screw nuts 182 via the rotary driving force transmission part 185. Multiple screw nuts 182 can be rotated synchronously. The multiple screw nuts 182 can be rotated individually by changing the transmission path of the rotary driving force transmission part 185.

The rotary driving force transmission part 185 is configured by, for example, gears. In this case, a driven gear is formed on the outer circumference of each screw nut 182, a driving gear is attached to the output shaft of the mold thickness adjustment motor 183, and a plurality of driven gears and an intermediate gear meshing with the driving gear are held rotatably at the center of the toggle support 130. The rotary driving force transmission part 185 may be configured by a belt, pulley or the like instead of a gear.

The operation of the mold thickness adjustment mechanism 180 is controlled by the controller 700. The controller 700 drives the mold thickness adjustment motor 183 to rotate the screw nut 182. As a result, the position of the toggle support 130 with respect to the tie bar 140 is adjusted and the interval L between the fixed platen 110 and the toggle support 130 is adjusted. A combination of multiple mold thickness adjustment mechanisms may be used.

The interval L is detected using the mold thickness adjustment motor encoder 184. The mold thickness adjustment motor encoder 184 detects the amount and direction of rotation of the mold thickness adjustment motor 183 and sends a signal indicating the result of the detection to the controller 700. The detection result of the mold thickness adjustment motor encoder 184 is used to monitor and control the position and interval L of the toggle support 130. The toggle support position detector for detecting the position of the toggle support 130 and the interval detector for detecting the interval L are not limited to the mold thickness adjustment motor encoder 184, and a general detector can be used.

The mold clamping device 100 may have a mold temperature controller to regulate the temperature of the mold device 800. The mold device 800 has a flow path of the temperature control medium inside. The mold temperature controller adjusts the temperature of the mold device 800 by adjusting the temperature of the temperature control medium supplied to the flow path of the mold device 800.

The mold clamping device 100 of the present embodiment is a horizontal type with the mold opening and closing direction in the horizontal direction, but it may be a vertical type with the mold opening and closing direction in the vertical direction.

The mold clamping device 100 in the present embodiment has the mold clamping motor 160 as a driving part. A hydraulic cylinder may be included instead of the mold clamping motor 160. The mold clamping device 100 may also have a linear motor for opening and closing the mold, and may include an electromagnet for clamping.

(Ejector Device)

In the description of the ejector device 200, as in the description of the mold clamping device 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector device 200 is attached to the movable platen 120 and moves back and forth with the movable platen 120. The ejector device 200 has an ejector rod 210 that ejects the molded product from the mold device 800 and a drive mechanism 220 that moves the ejector rod 210 in the moving direction (X-axis direction) of the movable platen 120.

The ejector rod 210 is disposed so as to move backward and forward in a through hole of the movable platen 120. The front end of the ejector rod 210 contacts an ejector plate 826 of the movable mold 820. The front end of the ejector rod 210 may or may not be connected to the ejector plate 826.

The drive mechanism 220 has, for example, an elector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector device 200 performs the ejection process under the control of the controller 700. In the ejection process, the ejector plate 826 is moved forward and the molded product is ejected by moving forward the ejector rod 210 from the standby position to the ejection position at a set moving velocity. The ejector motor is then driven to move backward the ejector rod 210 at a set moving velocity and the ejector plate 826 is moved backward to its original standby position.

The position and velocity of the ejector rod 210 are detected using, for example, an ejector motor encoder. The ejector motor encoder detects the rotation of the ejector motor and sends a signal indicating the result of the detection to the controller 700. The ejector rod position detector for detecting the position of the ejector rod 210 and the ejector rod moving velocity detector for detecting the moving velocity of the ejector rod 210 are not limited to ejector motor encoders, and a general detector can be used.

(Injection Device)

In the description of the injection device 300, unlike the description of the mold clamping device 100 and the description of the ejector device 200, the moving direction of the screw 330 during filling (for example, the negative X-axis direction) is described as forward and the moving direction of the screw 330 during measuring (for example, the positive X-axis direction) is described as backward.

The injection device 300 is disposed on a slide base 301, and the slide base 301 is disposed freely moving forward and backward with respect to the injection device frame 920. The injection device 300 is placed freely moving forward and backward with respect to the mold device 800. The injection device 300 touches the mold device 800 and fills the cavity space 801 in the mold device 800 with the molding material measured in the cylinder 310. The injection device 300 has, for example, a cylinder 310 that heats the molding material, a nozzle 320 provided at the front end of the cylinder 310, a screw 330 that is placed in the cylinder 310 freely moving forward and backward and freely rotating, a measuring motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin and the like. The molding material is formed, for example, in the form of a pellet and is supplied to the feed port 311 in a solid state. The feed port 311 is formed at the rear of the cylinder 310. A cooler 312, such as a water-cooled cylinder, is provided on the outer periphery at the rear of the cylinder 310. In front of the cooler 312, a heater 313 such as a band heater and a temperature detector 314 are provided on the outer periphery of the cylinder 310.

The cylinder 310 is divided into multiple zones in the axial direction (for example, X-axis direction) of the cylinder 310. Each of the multiple zones is provided with the heater 313 and the temperature detector 314. A predetermined temperature is set in each of the multiple zones, and the controller 700 controls the heater 313 so that the temperature detected by the temperature detector 314 becomes the set temperature.

A nozzle 320 is provided at the front end of the cylinder 310 and pressed against the mold device 800. The heater 313 and the temperature detector 314 are provided on the outer periphery of the nozzle 320. The controller 700 controls the heater 313 so that the detection temperature of the nozzle 320 becomes the set temperature.

The screw 330 is disposed so as to be able to rotate and move in the forward and backward direction in the cylinder 310. As the screw 330 is rotated, the molding material is sent forward along the spiral groove of the screw 330. The molding material is gradually melted by heat from the cylinder 310 while being sent forward. As the liquid molding material is sent forward of the screw 330 and accumulated at the front of the cylinder 310, the screw 330 is moved backward. When the screw 330 is then moved forward, the liquid molding material accumulated in front of the screw 330 is injected from the nozzle 320 and filled into the mold device 800.

A backflow prevention ring 331 is attached to the front of the screw 330 in a retractable manner as a backflow prevention valve to prevent backflow of the molding material from the front to the rear of the screw 330 when the screw 330 is pushed forward.

As the screw 330 is moved forward, the backflow prevention ring 331 is pushed backward by the pressure of the molding material ahead of the screw 330 and retreats relative to the screw 330 to a blocking position (see FIG. 2) that blocks the flow path of the molding material. This prevents the molding material accumulated in front of the screw 330 from flowing backward.

In contrast, when the screw 330 is rotated, the backflow prevention ring 331 is pushed forward by the pressure of the molding material sent forward along the spiral groove of the screw 330 and moved forward relatively to the screw 330 to an open position (see FIG. 1) that opens the flow path of the molding material. This sends the molding material forward of the screw 330.

The backflow prevention ring 331 may be either a co-rotating type that rotates with the screw 330 or a non-co-rotating type that does not rotate with the screw 330.

The injection device 300 may have a driving source that moves the backflow prevention ring 331 back and forth with respect to the screw 330 between the open position and the closed position.

The measuring motor 340 rotates the screw 330. The driving source for rotating the screw 330 is not limited to the measuring motor 340, but may be, for example, a hydraulic pump and the like.

The injection motor 350 moves the screw 330 back and forth. Between the injection motor 350 and the screw 330, a motion conversion mechanism is provided to convert the rotational motion of the injection motor 350 into the linear motion of the screw 330. The motion conversion mechanism has a screw shaft, for example, and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder and the like.

The load detector 360 detects the load transmitted between the injection motor 350 and the screw 330. The detected load is converted to pressure by the controller 700. The load detector 360 is provided in the transmission path of the load between the injection motor 350 and the screw 330 to detect the load acting on the load detector 360.

The load detector 360 sends a signal of the detected load to the controller 700. The load detected by the load detector

360 is converted into the pressure acting between the screw 330 and the molding material and is used to control and monitor the pressure the screw 330 receives from the molding material, the back pressure against the screw 330, and the pressure acting on the molding material from the screw 330.

The pressure detector for detecting the pressure of the molding material is not limited to the load detector 360, but a general detector can be used. For example, a nozzle pressure sensor or an in-mold pressure sensor may be used. The nozzle pressure sensor is installed in the nozzle 320. The in-mold pressure sensor is installed inside the mold device 800.

The injection device 300 performs a measuring process, filling process, pressure-holding process, and the like, under the control of the controller 700. The filling and pressure-holding processes may be collectively referred to as the injection process.

In the measuring process, the measuring motor 340 is driven to rotate the screw 330 at a set rotational velocity and feed the molding material forward along the spiral groove of the screw 330. According to this, the molding material is gradually melted. As the liquid molding material is sent forward of the screw 330 and accumulated at the front of the cylinder 310, the screw 330 is moved backward. The rotational velocity of the screw 330 is detected using, for example, the measuring motor encoder 341. The measuring motor encoder 341 detects the rotation of the measuring motor 340 and sends a signal indicating the detection result to the controller 700. The screw-rotation velocity detector for detecting the rotation velocity of the screw 330 is not limited to the measuring motor encoder 341, and a general detector can be used.

In the measuring process, a set back pressure may be applied to the screw 330 by driving the injection motor 350 to limit the sudden backward movement of the screw 330. The back pressure against the screw 330 is detected using, for example, the load detector 360. When the screw 330 moves backward to the measuring completion position and a predetermined amount of molding material accumulates in front of the screw 330, the measuring process is completed.

The position and rotational velocity of the screw 330 in the measuring process are set together as a series of setting conditions. For example, measuring start position, rotational velocity switching position, and measuring completion position are set. These positions are arranged in this order from front to back and represent the start and end points of the section where the rotational velocity is set. For each section, a rotational velocity is set. One or more rotational velocity switching positions may be used. The rotational velocity switching position need not be set. Also, back pressure is set for each section.

In the filling process, the injection motor 350 is driven to move forward the screw 330 at a set moving velocity, and the liquid molding material accumulated in front of the screw 330 is filled into the cavity space 801 in the mold device 800. The position and moving velocity of the screw 330 are detected using, for example, the injection motor encoder 351. The injection motor encoder 351 detects the rotation of the injection motor 350 and sends a signal indicating the result of the detection to the controller 700. When the position of the screw 330 reaches the set position, switching (so-called V/P switching) from the filling process to the pressure-holding process is performed. The position where the V/P switching is performed is also called the V/P switching position. The set moving velocity of the screw 330 may be changed according to the position, time, or the like of the screw 330.

The position and moving velocity of the screw 330 in the filling process are set together as a series of setting conditions. For example, a filling start position (also called the injection start position), a moving velocity switching position, and a V/P switching position are set. These positions are arranged in this order from the rear to the front and represent the start and end points of the section in which the moving velocity is set. For each section, a moving velocity is set. The moving velocity switching position may be one or more. The moving velocity switching position need not be set.

For each section where the moving velocity of the screw 330 is set, an upper limit of the pressure of the screw 330 is set. The pressure of the screw 330 is detected by the load detector 360. If the pressure of the screw 330 is less than or equal to the set pressure, the screw 330 is moved forward at the set moving velocity. In contrast, if the pressure of the screw 330 exceeds the set pressure, the screw 330 is moved forward at a slower moving velocity than the set moving velocity so that the pressure of the screw 330 is less than or equal to the set pressure for the purpose of mold protection.

After the position of the screw 330 reaches the V/P switching position in the filling process, the screw 330 may be temporarily stopped at the V/P switching position, and then the V/P switching may be performed. Just before the V/P switch, a slow forward or slow backward movement of the screw 330 may be performed instead of stopping the screw 330. Moreover, the screw position detector for detecting the position of the screw 330 and the screw moving velocity detector for detecting the moving velocity of the screw 330 are not limited to the injection motor encoder 351, and a general detector can be used.

In the pressure-holding process, the injection motor 350 is driven to push the screw 330 forward, keeping the pressure of the molding material at the front end of the screw 330 (hereafter, it is also called "holding pressure") at a set pressure and pushing the remaining molding material in the cylinder 310 toward the mold device 800. The missing molding material due to cooling shrinkage in the mold device 800 can be replenished. The holding pressure is detected using, for example, the load detector 360. The set value of the holding pressure may be changed according to the elapsed time from the start of the pressure-holding process and the like. The holding pressure in the pressure-holding process and the holding time for holding the holding pressure may be set multiple times, respectively, and may be set together as a series of setting conditions.

In the pressure-holding process, the molding material in the cavity space 801 in the mold device 800 is gradually cooled, and upon completion of the pressure-holding process, the inlet of the cavity space 801 is blocked by the solidified molding material. This condition is called a gate seal and prevents backflow of the molding material from the cavity space 801. After the pressure-holding process, a cooling process is initiated. The cooling process involves solidifying the molding material in the cavity space 801. The measuring process may be performed during the cooling process for the purpose of shortening the molding cycle time.

The injection device 300 of the present embodiment is an in-line screw system, but a pre-plastic system or the like may be used. The pre-plastic injection equipment supplies the injection cylinder with the molding material melted in the plasticizing cylinder, and the injection cylinder injects the molding material into the mold device. Within the plasticizing cylinder, the screw is rotatably and non-movably positioned in the forward and backward direction or the screw is rotatably and movably positioned in the forward and backward direction. In contrast, in the injection cylinder, a plunger is placed freely moving forward and backward.

In addition, the injection device 300 of the present embodiment may be a horizontal type in which the axial direction of the cylinder 310 is horizontal, or a vertical type in which the axial direction of the cylinder 310 is vertical. The mold clamping device combined with the vertical injection device 300 may be either vertical or horizontal. Similarly, the mold clamping device combined with the horizontal injection device 300 may be either horizontal or vertical.

(Moving Device)

In the description of the moving device 400, as in the description of the injection device 300, the moving direction of the screw 330 during filling (for example, the negative X-axis direction) is referred to as the front, and the moving direction of the screw 330 during measuring (for example, the positive X-axis direction) is referred to as the rear.

The moving device 400 moves the injection device 300 forward and backward with respect to the mold device 800. The moving device 400 also presses the nozzle 320 against the mold device 800 to produce a nozzle touch pressure. The moving device 400 includes a hydraulic pump 410, a motor 420 as a driving source, a hydraulic cylinder 430 as a hydraulic actuator and the like.

The hydraulic pump 410 has a first port 411 and a second port 412. The hydraulic pump 410 is a pump that can rotate in both directions, and by switching the rotation direction of the motor 420, hydraulic fluid (for example, oil) is taken in from one of the first port 411 and the second port 412 and discharged from the other to generate hydraulic pressure. The hydraulic pump 410 can also suck the hydraulic fluid from the tank and discharge the hydraulic fluid from either the first port 411 or the second port 412.

The motor 420 operates the hydraulic pump 410. The motor 420 drives the hydraulic pump 410 in a rotational direction and a rotational torque according to a control signal from the controller 700. The motor 420 may be an electric motor or an electric servomotor.

The hydraulic cylinder 430 has a cylinder body 431, a piston 432, and a piston rod 433. The cylinder body 431 is fixed to the injection device 300. The piston 432 divides the inside of the cylinder body 431 into a front chamber 435 as a first chamber and a rear chamber 436 as a second chamber. The piston rod 433 is fixed to the fixed platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection device 300 is pushed forward. The injection device 300 is moved forward and the nozzle 320 is pressed against the fixed mold 810. The front chamber 435 functions as a pressure chamber that generates the nozzle touch pressure of the nozzle 320 by the pressure of the hydraulic fluid supplied from the hydraulic pump 410.

In contrast, the rear chamber 436 of the hydraulic cylinder 430 is connected to the second port 412 of the hydraulic pump 410 through the second flow path 402. When the hydraulic fluid discharged from the second port 412 is supplied to the rear chamber 436 of the hydraulic cylinder 430 through the second flow path 402, the injection device 300 is pushed backward. The injection device 300 is moved backward and the nozzle 320 is separated from the fixed mold 810.

In the present embodiment, the moving device 400 includes a hydraulic cylinder 430, but the present invention is not limited to this. For example, instead of the hydraulic cylinder 430, an electric motor and a motion conversion mechanism that converts the rotational motion of the electric motor into the linear motion of the injection device 300 may be used.

(Controller)

The controller 700 is configured by, for example, a computer and has a Central Processing Unit (CPU) 701, a storage medium 702 such as a memory, an input interface 703, and an output interface 704 as illustrated in FIGS. 1 and 2. The controller 700 performs various controls by having the CPU 701 execute the program stored in the storage medium 702. In addition, the controller 700 receives a signal from the outside at the input interface 703 and transmits a signal to the outside at the output interface 704. In addition, the controller 700 may send and receive information to and from an information processing device (e.g., personal computer) connected via a network with a communication interface (not illustrated).

The controller 700 repeatedly manufactures the molded product by repeating the measuring process, mold closing process, pressure-boosting process, clamping process, filling process, pressure-holding process, cooling process, depressurization process, mold opening process, ejection process, and the like. The sequence of operations to obtain the molded product, for example, from the beginning of the measuring process to the beginning of the next measuring process, is also called a "shot" or "molding cycle". The time required for one shot is also called the "molding cycle time" or "cycle time."

One molding cycle has, for example, the measuring process, mold closing process, pressure-boosting process, mold clamping process, filling process, pressure-holding process, cooling process, depressurizing process, mold opening process, and ejection process, in this order. The order here is the order of the start of each process. The filling process, pressure-holding process, and cooling process are performed during the clamping process. The start of the clamping process may coincide with the start of the filling process. The completion of the depressurization process coincides with the start of the mold opening process.

For the purpose of shortening the molding cycle time, multiple processes may be performed simultaneously. For example, the measuring process may be performed during the cooling process of the previous molding cycle or during the clamping process. In this case, the mold closing process may be performed at the beginning of the molding cycle. The filling process may also be started during the mold closing process. The ejection process may also be started during the mold opening process. If an on-off valve is provided to open and close the flow path of the nozzle 320, the mold opening process may be started during the measuring process. This is because even if the mold opening process is started during the measuring process, the molding material does not leak from the nozzle 320 if the on-off valve closes the flow path of the nozzle 320.

It should be noted that a single molding cycle may have processes other than the measuring process, mold closing process, pressure-boosting process, mold clamping process, filling process, pressure-holding process, cooling process, depressurizing process, mold opening process, and ejection process.

For example, after the completion of the pressure-holding process and before the start of the measuring process, a pre-measuring suck back process may be performed in which the screw 330 is moved backward to a preset measuring start position. The pressure of the molding material accumulated ahead of the screw 330 before the start of the measuring process can be reduced and the sudden backward movement of the screw 330 at the start of the measuring process can be prevented.

After the completion of the measuring process and before the start of the filling process, a post-measuring suck back process may be performed in which the screw 330 is moved backward to a preset filling start position (also called the injection start position). The pressure of the molding material accumulated ahead of the screw 330 before the start of the filling process can be reduced and the leakage of the molding material from the nozzle 320 before the start of the filling process can be prevented.

The controller 700 is connected to an operating device 750 that accepts input operations by the user and a display 760 that displays a screen. The operating device 750 and the display 760 are configured by, for example, a touch panel 770 and may be integrated. The touch panel 770 as the display 760 displays the screen under control by the controller 700. Information such as the settings of the injection molding machine 10 and the current status of the injection molding machine 10 may be displayed on the screen of the touch panel 770. Moreover, on the screen of the touch panel 770, for example, an operation part such as a button or an input field for accepting an input operation by the user may be displayed. The touch panel 770 as the operating device 750 detects an input operation on the screen by the user and outputs a signal corresponding to the input operation to the controller 700. Thus, for example, while confirming the information displayed on the screen, the user can operate the operation part provided on the screen to set the injection molding machine 10 (including input of setting values) and the like. When the user operates the operation part provided on the screen, the operation of the injection molding machine 10 corresponding to the operation part can be performed. The operation of the injection molding machine 10 may be, for example, the operation (including stopping) of the mold clamping device 100, the ejector device 200, the injection device 300, the moving device 400, and the like. In addition, the operation of the injection molding machine 10 may be such as switching the screen displayed on the touch panel 770 as the display 760.

The operating device 750 and the display 760 of the present embodiment are described as being integrated as the touch panel 770, but they may be provided independently. In addition, a plurality of operating devices 750 may be provided. The operating device 750 and the display 760 are arranged on the operating side (negative Y-axis direction) of the mold clamping device 100 (more specifically, the fixed platen 110).

First Embodiment

Figure 3:
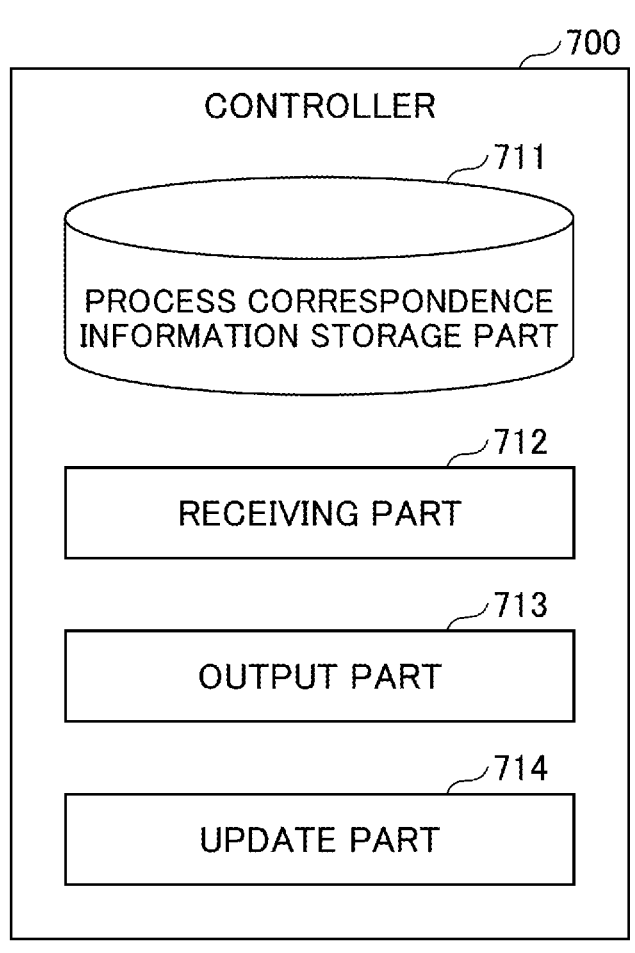
FIG. 3 is a functional block diagram illustrating components of a controller according to the first embodiment.

FIG. 3 is a functional block diagram illustrating the components of the controller 700 according to the first embodiment. The functional blocks illustrated in FIG. 3 are conceptual, and need not be physically constructed as illustrated. All or part of each functional block can be functionally or physically distributed and integrated in an arbitrary unit. All or an optional part of each processing function performed in each function block is implemented by a program executed by the CFU 701. Alternatively, each functional block may be implemented as hardware by wired logic. As illustrated in FIG. 3, the controller 700 includes a receiving part 712, an output part 713, and an update part 714. Further, the controller 700 includes a process correspondence information storage part 711 in the storage medium 702.

The process correspondence information storage part 711 stores information on an item associated with a process. FIG. 4 is a diagram illustrating a table structure of the process correspondence information storage part 711 according to the present embodiment. As illustrated in FIG. 4, the process correspondence information storage part 711 according to the present embodiment stores, in association with each process, information on items to be displayed when the process is selected. The process correspondence information storage part 711 illustrated in FIG. 4 is an example in which items to be displayed are associated with each process. Further, the process correspondence information storage part 711 stores scale information for displaying the item as information related to the item. In the process correspondence information storage part 711 according to the present embodiment, the maximum value and the minimum value to be displayed for each item are associated as scale information.

In the present embodiment, the item is information displayed as waveform data (an example of display information) with respect to a process, and indicates setting information indicating the setting of the process or a performance value detected in the process.

In the example illustrated in FIG. 4, items to be displayed when the process is selected are set in the process "start filling". In the process "start filling", "injection velocity setting" is set in "item 1", "injection velocity detection" is set in "item 2", and "pressure-holding setting" is set in "item 3". Although omitted in FIG. 4, each of "Item 4" and "Item 5" is set with an item to be displayed when the process is selected. These pieces of information are assigned to an item field of a channel field to be described later.

Further, according to the present embodiment, scale information for displaying the item is associated in the process correspondence information storage part 711. For example, "100.00" is set as "maximum value (item 1)" and "−100.00" is set as "minimum value (item 1)" as scale information of "injection velocity setting" of "item 1". Similarly, in "Ch-2" to "Ch-5", a maximum value and a minimum value are set as scale information. These pieces of information are assigned to the maximum value field and the minimum value field of the channel field, which will be described later.

Referring back to FIG. 3, the receiving part 712 receives a user's operation from the operating device 750 via the input interface 703.

The output part 713 outputs data such as a display screen to the display 760. The output part 713 according to the present embodiment outputs a display screen to the display 760, in which the display screen includes setting information set by the user in each step of molding processing by the injection molding machine 10 or waveform data (an example of display information) indicating a change in a waveform by a performance value in the step. Although the present embodiment describes an example of outputting a display screen or the like to the display 760, the output destination of data is not limited to the display 760. For example, the output part 713 may output data such as a display screen to an information processing apparatus connected via a network.

Figure 5:
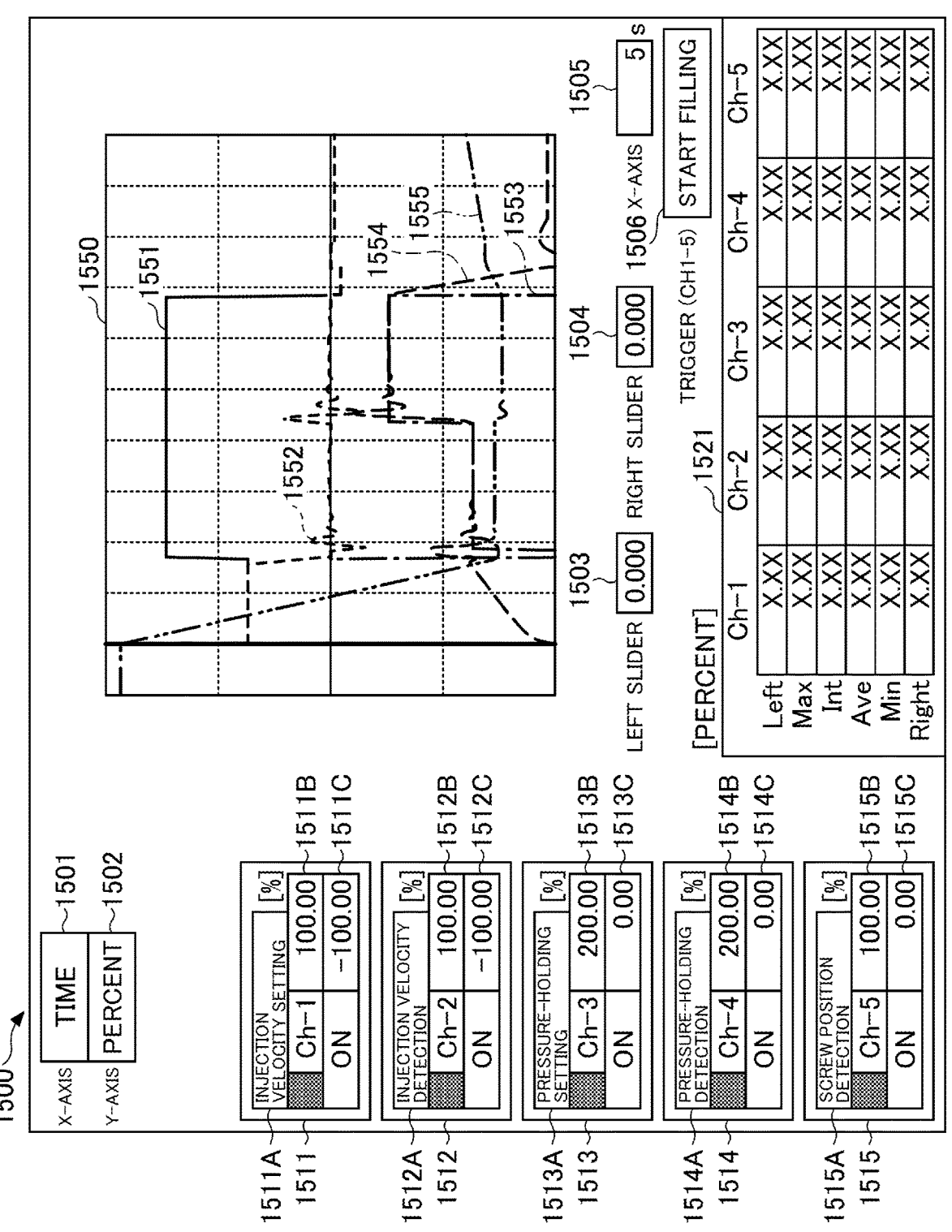
FIG. 5 is a diagram illustrating a display screen output by the output part according to the first embodiment.

FIG. 5 is a diagram illustrating a display screen output by the output part 713 of the present embodiment. As illustrated in FIG. 5, the display screen 1500 indicates an X-axis unit field 1501, a Y-axis unit field 1502, a left slider 1503, a right slider 1504, an X-axis field 1505, and a trigger (CH1-5) field 1506. Further, on the display screen 1500, five channel fields (the 1st channel field 1511 to the 5th channel field 1515), a selection range display field 1521, and a waveform data field 1550 are indicated. In the present embodiment, the channel field is a field for selecting an item to be displayed.

In the display screen illustrated in FIG. 5, the setting for each shot of the injection molding machine 10 and the performance values detected by the various sensors are displayed. In the display screen of the present embodiment, the performance value of the current shot can be displayed in real time.

The receiving part 712 illustrated in FIG. 5 receives a selection operation or an input operation to the above-described field via the operating device 750. The output part 713 switches the display screen (For example, the waveform data field 1550) displayed on the display 760 according to the received selection operation or input operation.

For example, the receiving part 712 receives a selection operation for the X-axis unit field 1501, the Y-axis unit field 1502, and the X-axis field 1505 via the operating device 750. The output part 713 switches the displayed waveform data field 1550 according to the received selection operation.

The X-axis unit field 1501 is a field for selecting a unit to be displayed on the X-axis of the waveform data field 1550. The Y-axis unit field 1502 is a field for selecting a unit to be displayed on the Y-axis of the waveform data field 1550. For example, "percent" or "engineering unit" can be selected in the Y-axis unit field 1502. The X-axis field 1505 is a field for setting a range of the X-axis (e.g., time) to be displayed in the waveform data field 1550.

The left slider 1503 is a field for setting the left end (display start position) of the waveform data field 1550 on the X axis in order to set the range to be displayed in the selection range display field 1521. The right slider 1504 is a field for setting the right end (display end position) of the waveform data field 1550 on the X axis in order to set the range to be displayed in the selection range display field 1521.

The trigger (CH1-5) field 1506 is a field for selecting a process to be displayed in the waveform data field 1550. The trigger (CH1-5) field 1506 according to the present embodiment is, for example, of a menu type, and the user performs an operation of selecting a process to be displayed from the menu displayed in the trigger (CH1-5) field 1506 via the operating device 750.

In FIG. 5, "start filling" is selected (set) in the trigger (CH1-5) field 1506. In the example illustrated in FIG. 5, the output part 713 outputs a display screen indicating the waveform data field 1550 including waveform data of each item set in the five channel fields (the 1st channel field 1511 to the 5th channel field 1515) at the "start filling" step.

The five channel fields (the 1st channel field 1511 to the 5th channel field 1515) are fields for selecting items to be displayed as waveform data in the waveform data field 1550. That is, in the present embodiment, 5 pieces of waveform data relating to the items assigned to each channel can be displayed in the waveform data field 1550.

The 1st channel field 1511 is a field for setting an item in Ch-1. An item to be displayed is set in the item field 1511A, a maximum value (an example of scale information) to be displayed as waveform data of the item Ch-1 is set in the maximum value field 1511B, and a minimum value (an example of scale information) to be displayed as waveform data of the item Ch-1 is set in the minimum value field 1511C.

When the item field 1511A is pressed via the operating device 750 (for example, the touch panel 770), the output part 713 outputs a menu screen on which a plurality of items are displayed. The receiving part 712 receives the selection of the item to be set to Ch-1 from the menu screen. The description of the item fields 1512A to 1515A is similarly omitted.

The maximum value field 1511B and the minimum value field 1511C are fields in which numerical values can be input. The receiving part 712 receives the input of the numerical value set in the maximum value field 1511B or the minimum value field 1511C via the operating device 750. The maximum value fields 1512B to 1515B and the minimum value fields 1512C to 1515C are likewise omitted.

In each channel field, "ON" or "OFF" is displayed so as to be settable. When "ON" is selected, the waveform data of the associated item is displayed, and when "OFF" is selected, the waveform data of the relevant item is not displayed.

In FIG. 5, "injection velocity setting" is set in the item field 1511A, "100.00" is set in the maximum value field 1511B, and "−100.00" is set in the minimum value field 1511C. The "injection velocity setting" indicates the setting of the injection velocity of the screw 330 set by the user.

The 2nd channel field 1512 is a field for setting an item in Ch-2. An item to be displayed is set in the item field 1512A, a maximum value (an example of scale information) to be displayed as waveform data of the item Ch-2 is set in the maximum value field 1512B, and a minimum value (an example of scale information) to be displayed as waveform data of the item Ch-2 is set in the minimum value field 1512C.

In FIG. 5, "injection velocity detection" is set in the item field 1512A, "100.00" is set in the maximum value field 1512B, and "−100.00" is set in the minimum value field 1512C. "Injection velocity detection" indicates the injection velocity of the screw 330 detected by the injection motor encoder 351.

The third channel field 1513 is a field for setting an item in Ch-3. An item to be displayed is set in the item field 1513A, a maximum value (an example of scale information) to be displayed as waveform data of the item Ch-3 is set in the maximum value field 1513B, and a minimum value (an example of scale information) to be displayed as waveform data of the item Ch-3 is set in the minimum value field 1513C.

In FIG. 5, "pressure-holding setting" is set in the item field 1513A, "200.00" is set in the maximum value field 1513B, and "0.00" is set in the minimum value field 1513C. The "pressure-holding setting" indicates the value of the pressure-holding set by the user.

The 4th channel field 1514 is a field for setting an item in Ch-4. An item to be displayed is set in the item field 1514A, a maximum value (an example of scale information) to be displayed as waveform data of the item Ch-4 is set in the maximum value field 1514B, and a minimum value (an example of scale information) to be displayed as waveform data of the item Ch-4 is set in the minimum value field 1514C.

In FIG. 5, "pressure-holding detection" is set in the item field 1514A, "200.00" is set in the maximum value field 1514B, and "0.00" is set in the minimum value field 1514C. "Pressure-holding detection" indicates the value of the pressure-holding detected by the load detector 360.

The 5th channel field 1515 is a field for setting an item in Ch-5. An item to be displayed is set in the item field 1515A, a maximum value (an example of scale information) to be displayed as waveform data of an item of Ch-5 is set in the maximum value field 1515B, and waveform data of an item of Ch-5 is displayed in the minimum value field 1515C.

In FIG. 5, "screw position detection" is set in the item field 1515A, "100.00" is set in the maximum value field 1515B, and "0.00" is set in the minimum value field 1515C. "Screw position detection" indicates the position of the screw 330 detected by the injection motor encoder 351.

The waveform data field 1550 of FIG. 5 is a field for displaying waveform data indicating changes in setting information or performance values indicated by items set in each of the five channel fields (the 1st channel field 1511 to the 5th channel field 1515) in a waveform in the process selected in the trigger (CH1-5) field 1506.

The waveform data 1551 in the waveform data field 1550 indicates a change in the "injection velocity setting" setting information set in the 1st channel field 1511 (Ch-1).

The maximum value of the waveform data field 1550 for displaying the waveform data 1551 is the value set in the maximum value field 1511B, and the minimum value of the waveform data field 1550 for displaying the waveform data 1551 is the value set in the minimum value field 1511C. The maximum value and the minimum value of the waveform data displayed in the waveform data field 1550 are similarly omitted in the following description.

The waveform data 1552 indicates a change in a detection result (an example of a performance value) of "injection velocity detection" set in the 2nd channel field 1512 (Ch-2).

The waveform data 1553 indicates a change in the setting information of the "pressure-holding setting" set in the 3rd channel field 1513 (Ch-3). The waveform data 1554 indicates a change in a detection result (an example of a performance value) of the "pressure-holding detection" set in the 4th channel field 1514 (Ch-4).

The waveform data 1555 indicates a change in a detection result (an example of a performance value) of "screw position detection" set in the 5th channel field 1515 (Ch-5).

Then, the receiving part 712 according to the present embodiment receives the selection of items for the item fields 1511A to 1515A of the respective channel fields as the displayed information of the process selected in the trigger (CH1-5) field 1506.

When the receiving part 712 receives the selection of the item, the output part 713 displays the waveform data indicating the change in the setting information or the detection result of the selected item in the waveform data field 1550.

The receiving part 712 receives numerical input operations via the operating device 750 for the left slider 1503 (the starting value on the left side of the X-axis of the waveform data field 1550) and the right slider 1504 (the ending value on the right side of the X-axis of the waveform data field 1550).

The selection range display field 1521 is a field in which statistical values, start values, end values, and the like for each item set in each channel field are displayed as a list within the range set by the left slider 1503 and the right slider 1504.

In the selection range display field 1521 illustrated in FIG. 5, statistical values or the like of items set in each of the channels (Ch-1 to Ch-5) are illustrated, for example, a start value (Left) at the left end, a maximum value (Max) within the range, an integral value (Int) within the range, an average value (Ave) within the range, a minimum value (Min) within the range, and an end value (Right) at the right end. The statistical values and the like for each item illustrated in the selection range display field 1521 are illustrated as an example, and other statistical values and the like may be displayed.

The trigger (CH1-5) field 1506 is a field for selecting a process to be displayed in the waveform data field 1550. The trigger (CH1-5) field 1506 according to the present embodiment is a menu format. The receiving part 712 receives an operation of selecting a process to be displayed from a plurality of processes illustrated on the menu screen via the operating device 750.

When the operation of selecting a process is received, the output part 713 according to the present embodiment outputs a display screen in which the waveform data, of the items selected in the item fields 1511A to 1515A in the process set in the trigger (CH1-5) field 1506, is displayed in the waveform data field 1550.

In FIG. 5, "start filling" is selected (set) in the trigger (CH1-5) field 1506. In the example illustrated in FIG. 5, in the "start filling" process, the output part 713 outputs the waveform data of each item set in the five channel fields (the 1st channel field 1511 to the 5th channel field 1515) on the display screen illustrated in the waveform data field 1550.

After the process displayed on the display screen is changed, the user needs to select an item to be displayed from the item fields 1511A to 1515A in order to display the desired waveform data. When the user performs such a selection operation, the user's operational burden increases. Therefore, the controller 700 according to the present embodiment can automatically switch the items associated with the process in response to the user's request when the receiving part 712 receives the process selection operation.

Figure 6:
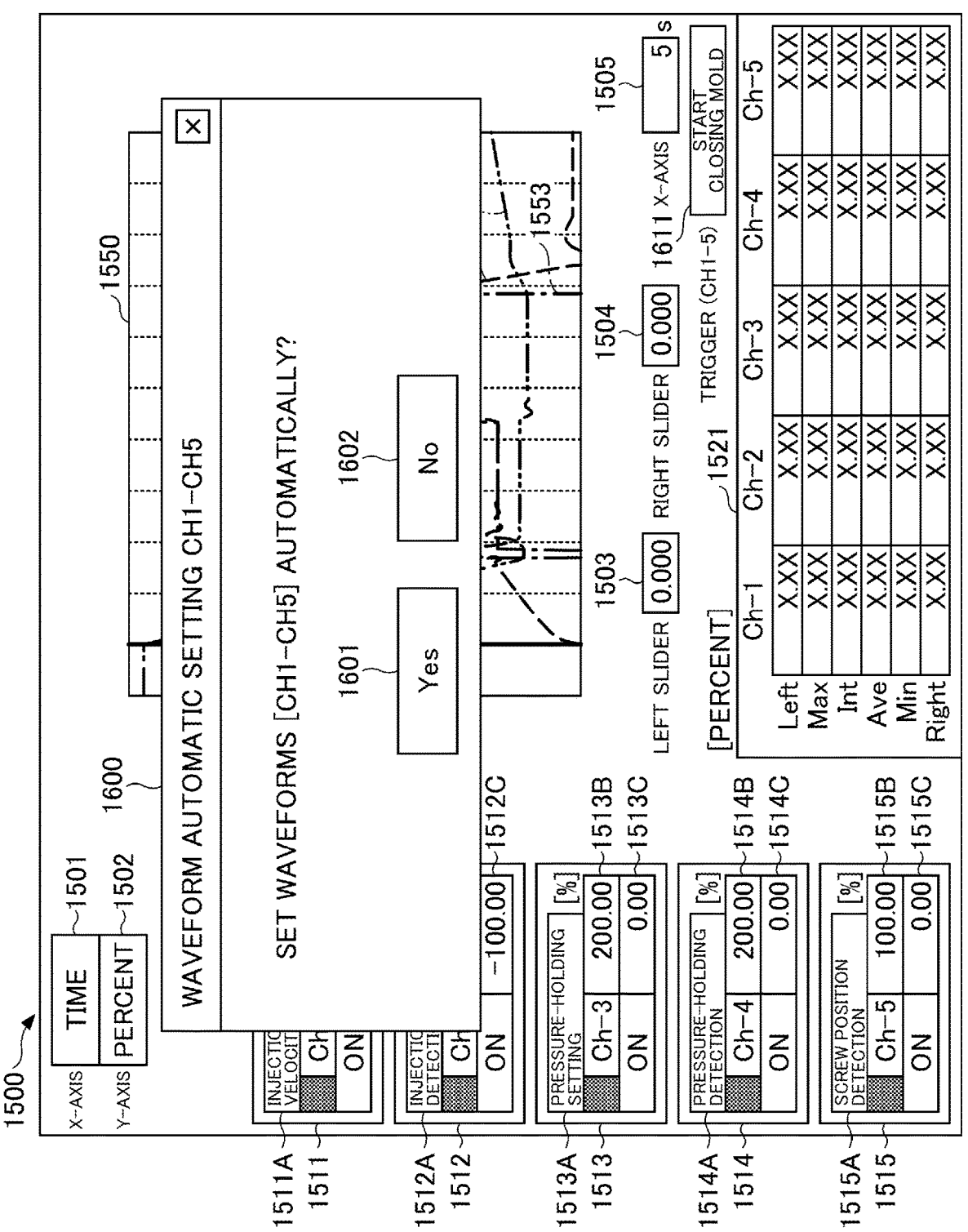
FIG. 6 is a diagram illustrating a pop-up screen output by the output part when a process change operation in a trigger field is received in the first embodiment.

FIG. 6 is a diagram illustrating a pop-up screen output by the output part 713 when a change operation of the process in the trigger (CH1-5) field 1506 is received.

The output part 713 according to the present embodiment outputs a pop-up screen (an example of query display information) for inquiring whether to switch to an item preliminarily associated with the process for which the selection is received when the receiving part 712 receives the selection of the process. In the example illustrated in FIG. 6, after the receiving part 712 receives the selection operation of the process "start closing mold" set in the trigger (CH1-5) field 1611, the output part 713 displays the pop-up screen 1600.

In the present embodiment, an example of switching from the process "start filling" to the process "start closing mold" will be described. The process for switching to the other process is the same as that for switching from the process "start filling" to the process "start closing mold", and the description thereof is omitted.

In the pop-up screen 1600, a "Yes" button 1601 and a "No" button 1602 are illustrated.

When the receiving part 712 receives the selection operation of the "No" button 1602, the output part 713 does not change the items set in the five channel fields (the 1st channel field 1511 to the 5th channel field 1515). That is, the output part 713 outputs a display screen including a waveform data field in which waveform data of the process after the change "start closing mold" is expressed in the items already set at the time of the process before the change "start filling".

In contrast, when the receiving part 712 receives the selection operation of the "Yes" button 1601, the output part 713 switches each of the five channel fields (the 1st channel field 1511 to the 5th channel field 1515) to an item associated with the process "start closing mold", and outputs a display screen including a waveform data field indicating waveform data for each item in the process "start closing mold" after the change.

The item associated with the process "start closing mold" is stored in the process correspondence information storage part 711. Therefore, the output part 713 reads the item associated with the process "start closing mold" by referring to the process association information storage part 711, so that the item associated with the process can be set in advance.

In other words, when the receiving part 712 receives the selection to automatically switch the item, the output part 713 outputs a display screen including the waveform data of the item preliminarily associated with the process in the process correspondence information storage part 711 that has received the selection.

Figure 7:
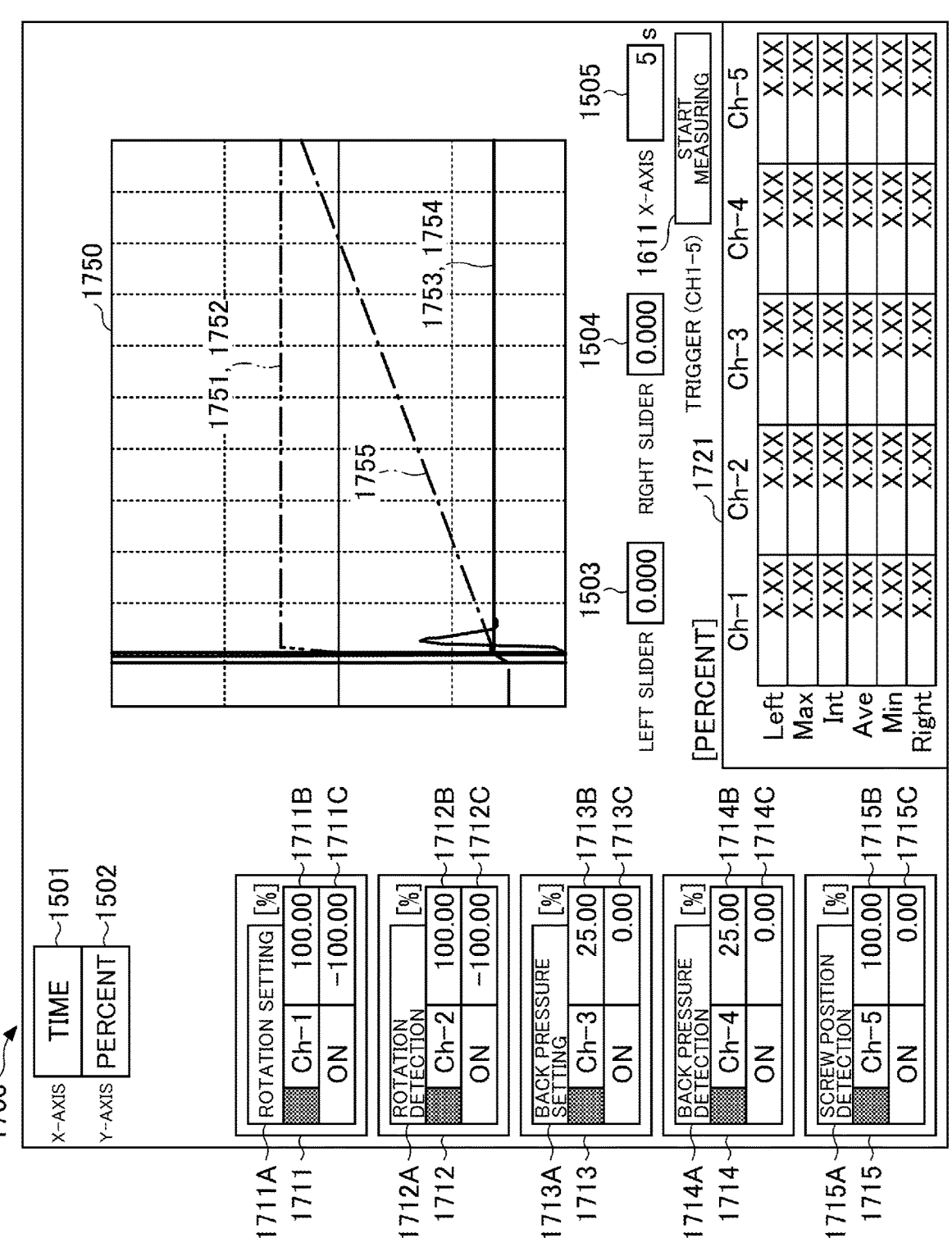
FIG. 7 is a diagram illustrating a display screen output by the output part according to the first embodiment.

FIG. 7 is a diagram illustrating a display screen output by the output part 713 of the present embodiment. In the display screen 1700 illustrated in FIG. 7, the same reference numerals are assigned to the same fields as in the display screen 1500 of FIG. 5, and the description thereof is omitted.

In the example illustrated in FIG. 7, the trigger (CH1-5) field 1611, the five channel fields (the 1st channel field 1711 to the 5th channel field 1715), the selection range display field 1721, and the waveform data field 1750 are updated.

In FIG. 7, the trigger (CH1-5) field 1506 displays a process "start measuring" selected by the user. The five channel fields (the 1st channel field 1711 to the 5th channel field 1715) are switched to the items corresponding to the process "start closing mold" in advance.

In this example, "rotation setting" is set in the item field 1711A, "100.00" is set in the maximum value field 1711B, and "−100.00" is set in the minimum value field 1711C. The "rotation setting" indicates the setting of the rotational speed of the screw 330. In this example, "rotation detection" is set in the item field 1712A, "100.00" is set in the maximum value field 1712B, and "−100.00" is set in the minimum value field 1712C. The "rotation detection" indicates the rotational speed of the screw 330 detected by the metering motor encoder 341.

In this example, "back pressure setting" is set in the item field 1713A, "25.00" is set in the maximum value field 1713B, and "0.00" is set in the minimum value field 1713C. The "back pressure setting" indicates setting of back pressure for the screw 330.

In this example, "back pressure detection" is set in the item field 1714A, "25.00" is set in the maximum value field 1714B, and "0.00" is set in the minimum value field 1714C. The "back pressure detection" indicates the back pressure for the screw 330 detected by the load detector 360.

In this example, "screw position detection" is set in the item field 1715A, "100.00" is set in the maximum value field 1715B, and "0.00" is set in the minimum value field 1715C. The "screw position detection" indicates the position of the screw 330 detected by the injection motor encoder 351.

The waveform data field 1750 of FIG. 7 is a field for displaying waveform data (an example of waveform information) indicating changes in the setting information or performance values indicated by the items set in each of the five channel fields (the 1st channel field 1711 to the 5th channel field 1715) in a waveform in the process "start measuring" changed in the trigger (CH1-5) field 1611.

The waveform data 1751 in the waveform data field 1750 indicates the setting information of the "rotation setting" set in the 1st channel field 1711 (Ch-1). The waveform data 1752 indicates a change in the detection result (an example of the performance value) of the "rotation detection" set in the 2nd channel field 1712 (Ch-2).

The waveform data 1753 indicates setting information of "back pressure setting" set in the third channel field 1713 (Ch-3). The waveform data 1754 indicates a change in a detection result (an example of a performance value) of "back pressure detection" set in the 4th channel field 1714 (Ch-4).

The waveform data 1755 indicates a change in a detection result (an example of a performance value) of "screw position detection" set in the 5th channel field 1715 (Ch-5).

In the selection range display field 1721, the start value (Left) at the left end, the maximum value (Max) within the range, the integrated value (Int) within the range, the average value (Ave) within the range, the minimum value (Min) within the range, and the end value (Right) at the right end of the items set in each of the channels (Ch-1 to Ch-5) are represented.

In order to automatically update items as illustrated in FIG. 7, when the "Yes" button 1601 is pressed in FIG. 6, the output part 713 reads information corresponding to items associated with the process "start measuring" from the process correspondence information storage part 711. The information related to the item includes scale information (maximum and minimum values displayed in the waveform data field 1750) in addition to information for specifying the "item" (for example, name).

The output part 713 generates and outputs the display screen illustrated in FIG. 7 based on the setting information of each item stored in the storage medium 702 and the performance values of the items received from various sensors based on the information about the read items. Although the present embodiment has described an example in which items are automatically switched based on the information stored in the process correspondence information storage part 711, other embodiments may be used.

Thus, the output part 713 according to the present embodiment outputs a display screen to the display 760, in which the display screen includes waveform data representing in wave form changes in the setting information or the performance values indicated by the items preliminarily associated with the process for which the selection is received among a plurality of items for which the selection can be received when the receiving part 712 receives the selection of the process.

When displaying the waveform data for each item, the output part 713 outputs a display screen indicating the waveform data according to the scale information (maximum value in the Y-axis, minimum value in the Y-axis) preliminarily stored in the process correspondence information storage part 711 as a range of setting information or performance values to be displayed as the item.

Further, in the controller 700 of the present embodiment, items preliminarily associated with processes can be changed.

The update part 714 updates the items preliminarily associated with the process according to the operation received by the operating device 750.

For example, the receiving part 712 receives an operation to change an item to be preliminarily associated with a process. Then, the update part 714 updates the item preliminarily associated with the process to be changed with respect to the process correspondence information storage part 711.

As described above, when the receiving part 712 receives the selection of a process, the output part 713 outputs a display screen including waveform data of an item preliminarily associated with the process in the process correspondence information storage part 711. Thus, the output part 713 can output a display screen including waveform data of items preliminarily associated with the process, which are changed based on the operation.

Next, a processing procedure performed when the selection of a process is received in the controller 700 according to the first embodiment will be described. FIG. 8 is a flowchart illustrating the control performed when the selection of the process is received in the controller 700 according to the first embodiment.

First, the output part 713 of the controller 700 outputs a display screen including a waveform data field indicating waveform data for each item in any process (S1801) to the display 760. Next, the receiving part 712 determines whether the selection operation of the process indicated by the trigger (CH1-5) field has been received from the operating device 750 (S1802). If it is determined that the selection operation is not received (S1802: No), the process of S1802 is repeated again.

In contrast, when the receiving part 712 determines that the process selection operation has been received (S1802: Yes), the output part 713 outputs a pop-up screen to confirm whether the process is automatically switched (S1803).

Next, the receiving part 712 determines whether the selection for automatically switching the items is received on the pop-up screen (for example, the pop-up screen 1600 illustrated in FIG. 6) (S1804).

If the receiving part 712 determines that the selection for automatically switching the items has not been received (the "No" button 1602 has been pressed) (S1804: No), the output part 713 outputs a display screen including a waveform data field in which waveform data of each item is represented in the selected step without switching the items (S1805).

In contrast, if the receiving part 712 determines that the selection for automatically switching the items has been received (the "Yes" button 1601 has been pressed) (S1804: Yes), the output part 713 switches the items to the items corresponding to the selected process, and outputs a display screen including a waveform data field in which waveform data of each switched item is represented in the selected process (S1806).

The controller 700 according to the present embodiment displays the waveform data of the item associated with the process for which the selection operation is received when the selection of the item is automatically switched on the pop-up screen displayed when the selection operation of the process is received. That is, since the controller 700 automatically sets the items corresponding to the process when the process selection operation is received from the user, the user does not need to manually set the items, and the user's operational burden is reduced.

Further, since the controller 700 according to the present embodiment automatically sets items corresponding to the process when the process selection operation is received from the user, the time required for setting items suitable for the process can be shortened. Therefore, the user can shorten the time until the state of the process is grasped.

Second Embodiment

In the above-described embodiment, an example of displaying waveform data relating to one process on a display screen has been described. However, the controller 700 is not limited to the display mode described above. Therefore, in the second embodiment, an example in which the waveform data field is displayed in a different area in each of a plurality of processes will be described. The configuration of the controller 700 of the second embodiment is the same as that of the first embodiment, and a description thereof will be omitted.

When the receiving part 712 receives an operation for displaying two processes, the output part 713 according to the present embodiment outputs a display screen in which waveform data fields for two processes are arranged in different areas.

In the display screen of the present embodiment, when displaying a plurality of processes, it is considered that two processes in the same or adjacent cycle are displayed. For example, by simultaneously displaying waveform data indicating the detection result of "start measuring" and waveform data indicating the detection result of "start filling", the user can confirm what kind of injection is performed based on the measurement result of the resin. As described above, by displaying a plurality of processes by the controller 700 according to the present embodiment, the user can grasp how the processing by any process affects other processes.

Figure 9:
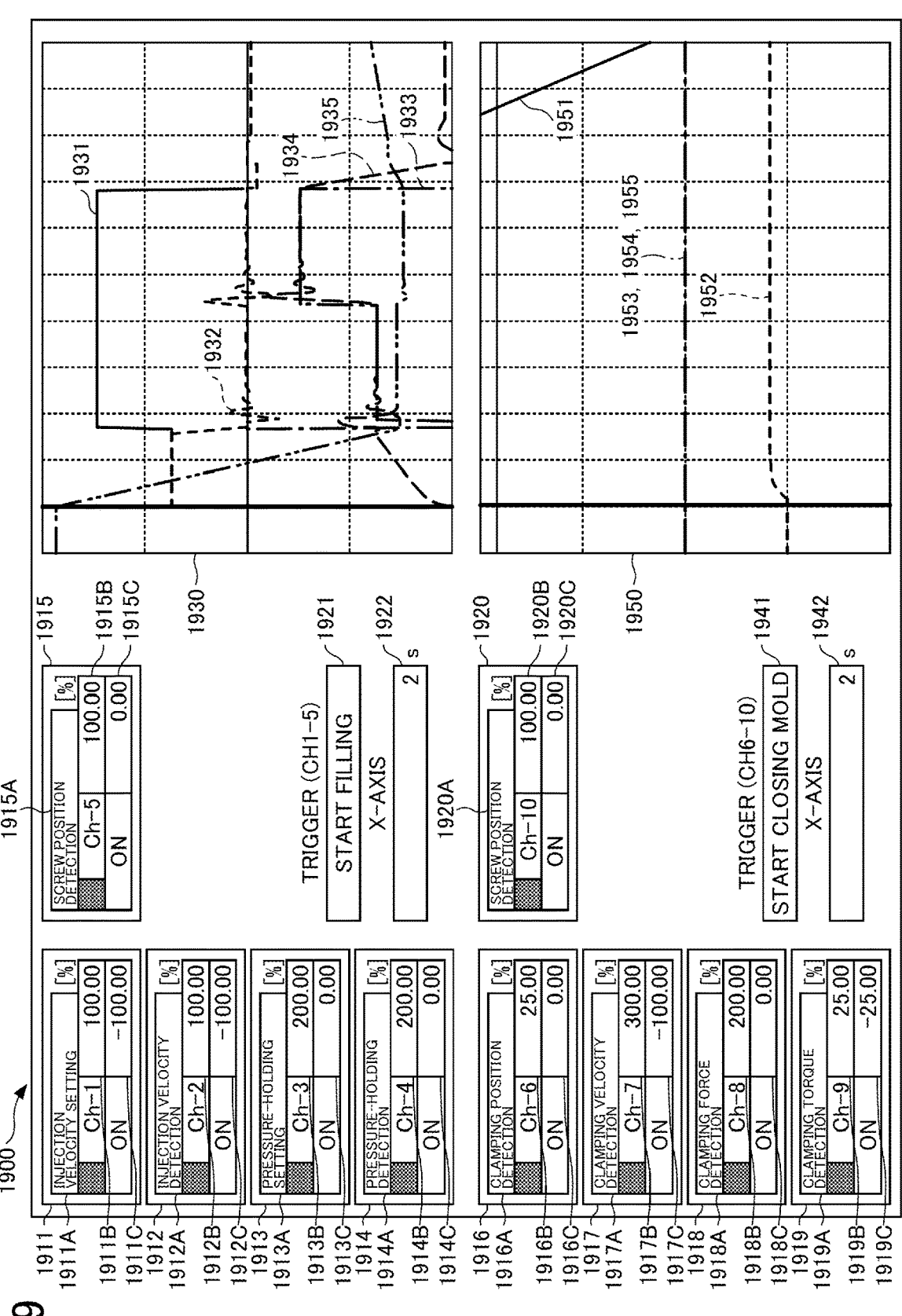
FIG. 9 is a diagram illustrating a display screen output by the output part according to a second embodiment.

FIG. 9 is a diagram illustrating a display screen output by the output part 713 of the present embodiment. As illustrated in FIG. 9, the display screen 1900 displays the waveform data field 1930 of the process "start filling" and the waveform data field 1950 of the process "start closing mold".

On the display screen 1900, a trigger (CH1-5) field 1921 and an X-axis field 1922 of the first process (for example, "Start filling") are illustrated. Further, on the display screen 1900, five channel fields (the 1st channel field 1911 to the 5th channel field 1915) for the first process (for example, "Start filling") and a waveform data field 1930 are illustrated.

The five channel fields (the 1st channel field 1911 to the 5th channel field 1915) are the same as the channel fields (the 1st channel field 1511 to the 5th channel field 1515) illustrated in FIG. 5 of the first embodiment, and description thereof is omitted.

As in the waveform data field 1550 of the first embodiment, the waveform data 1931 to 1935 illustrated in the waveform data field 1930 indicates a change in the setting information of each item illustrated in the 1st channel field 1511 to the 5th channel field 1515 or a change in the performance value.

On the display screen 1900, a trigger (CH6-10) field 1941 and an X-axis field 1942 of the second process (For example, "Start closing mold") are indicated. Further, on the display screen 1900, five channel fields (the 6th channel field 1916 to the 10th channel field 1920) for the second process (for example, "Start closing mold") and a waveform data field 1950 are indicated.

In the trigger (CH6-10) field 1941, the process "start closing mold" is displayed. Items corresponding to the "start closing mold" process are set in the five channel fields (the 6th channel field 1916 to the 10th channel field 1920).

In this example, "clamping position detection" is set in the item field 1916A, "25.00" is set in the maximum value field 1916B, and "0.00" is set in the minimum value field 1916C. "Clamping position detection" indicates the position of the movable platen 120 converted from the position of the crosshead 151 detected by the clamping motor encoder 161.

In this example, "clamping velocity detection" is set in the item field 1917A, "300.00" is set in the maximum value field 1917B, and "−100.00" is set in the minimum value field 1917C. "Injection velocity detection" indicates the velocity of the crosshead 151 detected by the clamping motor encoder 161.

In this example, "clamping force detection" is set in the item field 1918A, "200.00" is set in the maximum value field

1918B, and "0.00" is set in the minimum value field 1918C. "Clamping force detection" indicates the detected clamping force of the tie bar strain detector 141.

In this example, "clamping torque detection" is set in the item field 1919A, "25.00" is set in the maximum value field 1919B, and "−25.00" is set in the minimum value field 17140. The "clamping torque detection" is indicated by the current value supplied to the clamping motor 160. The current value may be detected by a current detector or may be determined from a control command value for an inverter that supplies current to the clamping motor 160.

In this example, "screw position detection" is set in the item field 1920A, "100.00" is set in the maximum value field 1920B, and "0.00" is set in the minimum value field 1920C. The "screw position detection" indicates the position of the screw 330 detected by the injection motor encoder 351.

The waveform data field 1950 of FIG. 9 is a field for displaying waveform data indicating changes in the setting information or performance values indicated by the items set in each of the five channel fields (the 6th channel field 1916 to the 10th channel field 1920) in a waveform in the process "start closing mold" set in the trigger (CH6-10) field 1941.

The waveform data 1951 in the waveform data field 1950 indicates a change in the detection result (an example of the performance value) of the "clamping position detection" set in the 6th channel field 1916. The waveform data 1952 indicates a change in the detection result (an example of the performance value) of the "clamping velocity detection" set in the 7th channel field 1917.

The waveform data 1953 indicates a change in a detection result (an example of a performance value) of the "clamping force detection" set in the 8th channel field 1918. The waveform data 1954 indicates a change in a detection result (an example of a performance value) of the "clamping torque detection" set in the 4th channel field 1714.

The waveform data 1955 indicates a change in a detection result (an example of a performance value) of the "screw position detection" set in the 10th channel field 1920.

When the receiving part 712 receives an operation to change the process for either the trigger (CH1-5) field 1921 or the trigger (CH6-10) field 1941, the output part 713 displays the waveform data of the item set in the item field (fields 1911A to 1915A or fields 1916A to 1920A) in the waveform data field (waveform data field 1930 or waveform data field 1950) for the process for which the change was received. In this case, as in the first embodiment, the item may be automatically switched to the item set in the item field (fields 1911A to 1915A or fields 1916A to 1920A).

Figure 10:
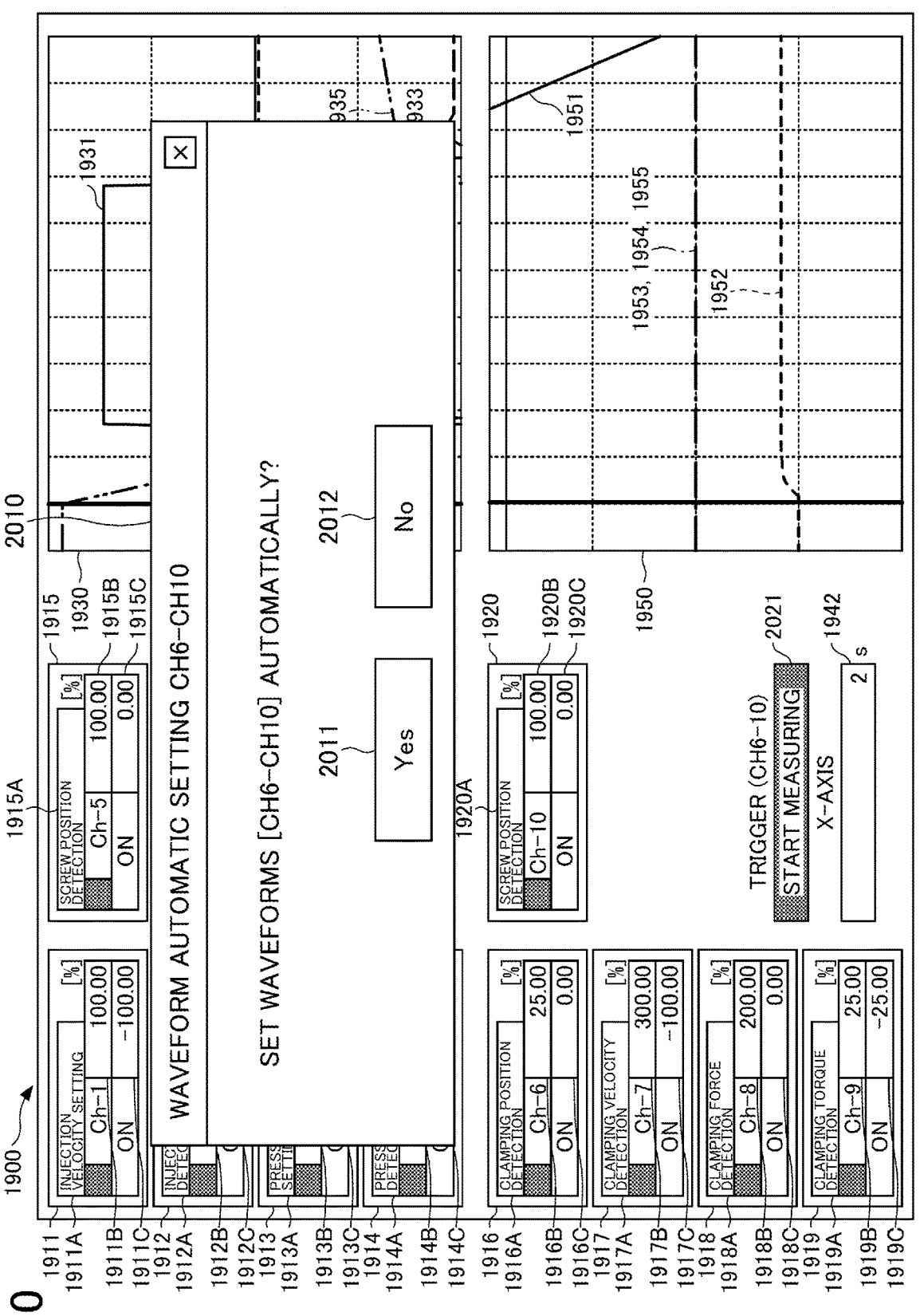
FIG. 10 is a diagram illustrating a pop-up screen output by the output part when a process change operation in the trigger field is received in the second embodiment.

FIG. 10 is a diagram illustrating a pop-up screen output by the output part 713 when a process change operation in the trigger (CH6-10) field 2021 is received. In the example illustrated in FIG. 10, in the trigger (CH6-10) field 2021 described below, the process change operation from the process "start closing mold" to the process "start measuring" is received.

As illustrated in FIG. 10, the output part 713 according to the present embodiment outputs a pop-up screen (an example of display information) 2010 for inquiring whether to switch to an item preliminarily associated with the process for which the selection is received when the receiving part 712 receives the selection of the process.

In the pop-up screen 2010, a "Yes" button 2011 and a "No" button 2012 are indicated.

When the receiving part 712 receives the selection operation of the "No" button 2012, the output part 713 does not switch the items set in the five channel fields (the 6th channel field 1916 to the 10th channel field 1920).

In contrast, when the receiving part 712 receives the selection operation of the "Yes" button 2011, the output part 713 switches each of the five channel fields (the 6th channel field 1916 to the 10th channel field 1920) to an item associated with the process "start measuring" and outputs a display screen including a waveform data field 1950 indicating waveform data for each switched item at the time of the changed process "start measuring".

Figure 11:
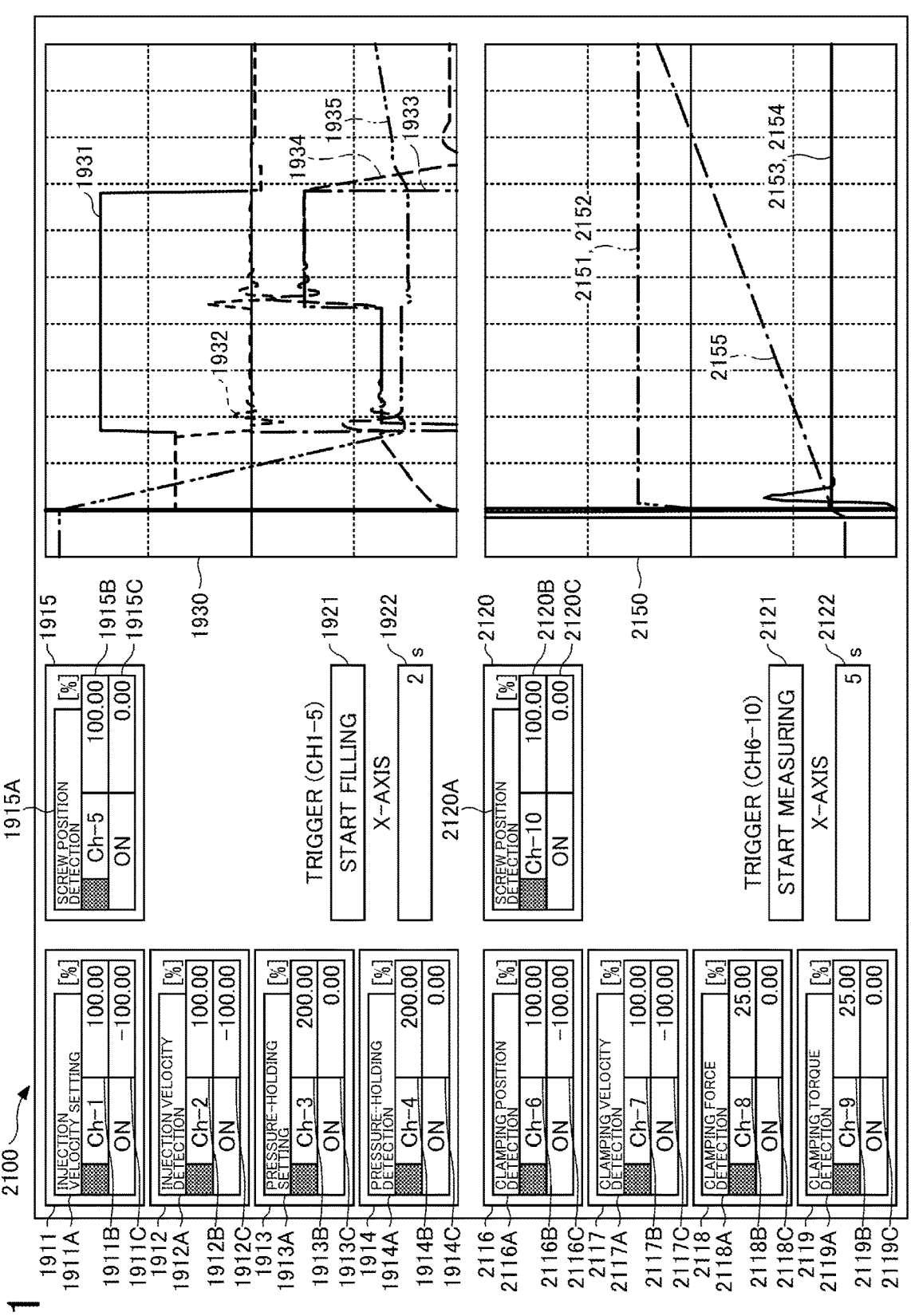
FIG. 11 illustrates an example of a display screen output by the output part according to the second embodiment.

FIG. 11 is a diagram illustrating a display screen output by the output part 713 of the present embodiment. In the display screen 2100 indicated in FIG. 11, the same reference numerals are assigned to the same fields as in the display screen 1900 of FIG. 9, and the description thereof is omitted.

FIG. 11 illustrates a display screen after automatically switching to the item corresponding to the process when the process selection operation is received. As illustrated in FIG. 11, the display screen 2100 displays the waveform data field 1930 of the process "start filling" and the waveform data field 2150 of the process "start measuring".

On the display screen 2100, a trigger (CH1-5) field 1921 and an X-axis field 1922 of the first process (for example, "start filling") are indicated. Five channel fields (the 1st channel field 1911 to the 5th channel field 1915) for the first process (for example, "start filling") and a waveform data field 1930 are indicated.

In the example illustrated in FIG. 11, as compared with FIG. 9, the trigger (CH6-10) field 2021, the five channel fields (the 6th channel field 2116 to the 10th channel field 2120), and the waveform data field 2150 are updated.

In FIG. 11, a trigger (CH6-10) field 2121 displays the updated process "start measuring". Items corresponding to the process "start measuring" are set in the five channel fields (the 6th channel field 2116 to the 10th channel field 2120) by the processing of the output part 713. Note that the items set in the 6th channel field 2116 to the 10th channel field 2120 are the same as the items illustrated in FIG. 7, and therefore the description thereof will be omitted.

The waveform data field 2150 of FIG. 11 is a field for displaying waveform data indicating changes in the setting information or performance values indicated by the items set in each of the five channel fields (the 6th channel field 2116 to the 10th channel field 2120) in a waveform at the process "start measuring" changed in the trigger (CH6-10) field 2121. The waveform data field 2150 of FIG. 11 is the same as the waveform data field 1750 illustrated in FIG. 7, and a description thereof is omitted.

Thus, when the receiving part 712 receives the selection of the process, the output part 713 according to the present embodiment outputs a display screen including waveform data representing in wave form changes in the setting information or the performance values indicated by the items preliminarily associated with the process for which the selection is received among a plurality of items for which the selection can be received, to the display 760.

When displaying the waveform data for each item, the output part 713 outputs a display screen indicating the waveform data according to the scale information (maximum value in the Y-axis, minimum value in the Y-axis) preliminarily stored in the process correspondence information storage part 711 as a range of setting information or performance values to be displayed as the item.

Figure 12:
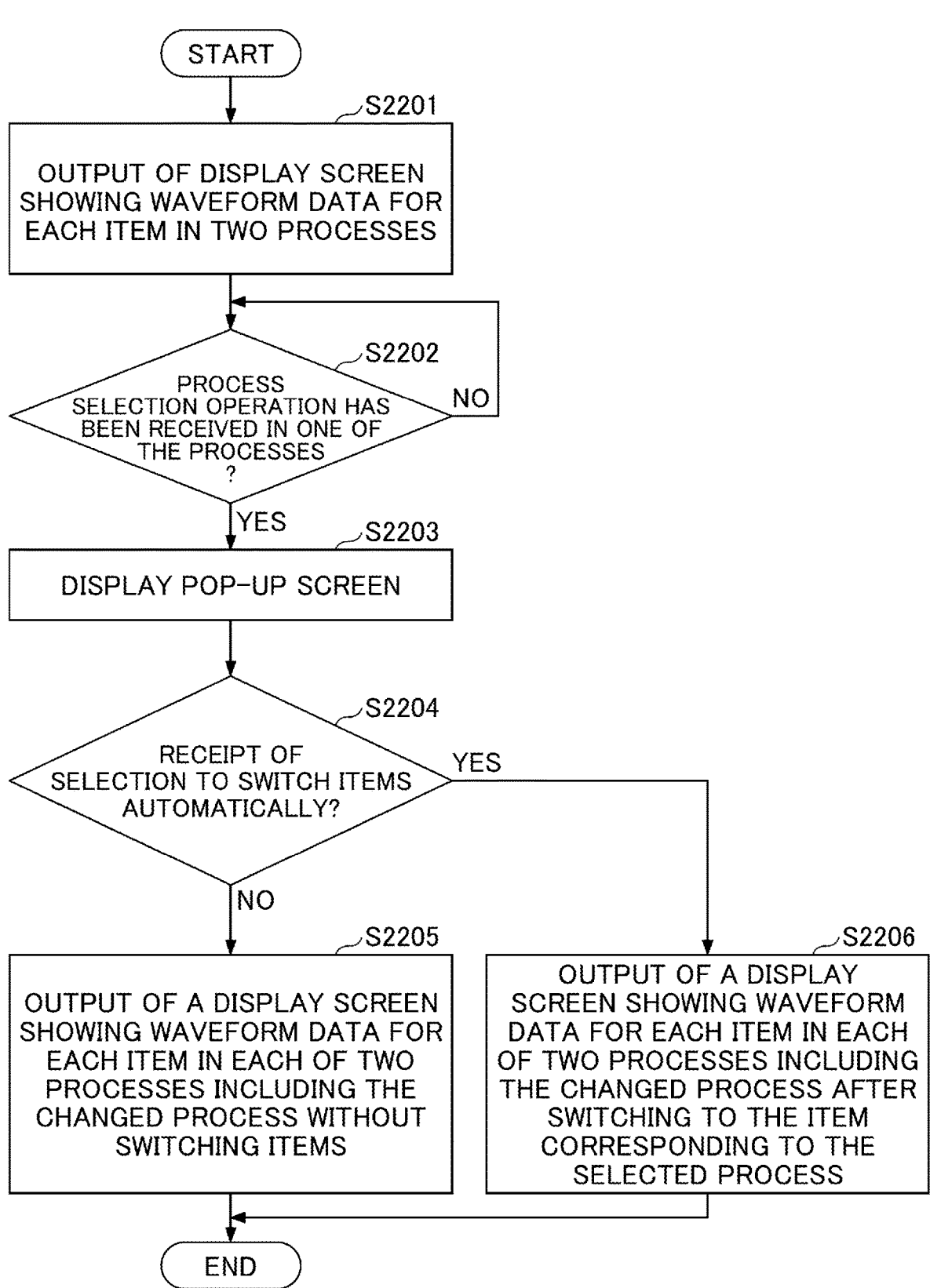
FIG. 12 is a flowchart illustrating the control performed when the selection of the process is received in the controller according to the second embodiment.

Next, a processing procedure performed when the selection of a process is received in the controller 700 according to the second embodiment will be described. FIG. 12 is a flowchart illustrating the control performed when the selection of the process is received in the controller 700 according to the second embodiment.

First, the output part 713 of the controller 700 outputs a display screen including a waveform data field in which the waveform data of each item is displayed to the display 760 for each of two processes (S2201).

Next, the receiving part 712 determines whether a process selection operation has been received in one of the trigger (CH1-5) fields of the plurality of processes from the operating device 750 (S2202). When it is determined that the selection operation is not received (S2202: No), the process of S2202 is repeated again.

In contrast, when the receiving part 712 determines that the process selection operation has been received (S2202: Yes), the output part 713 outputs (displays) a pop-up screen for confirming whether the process is automatically switched (S2203).

Next, the receiving part 712 determines whether the selection for automatically switching the items is received on the pop-up screen (for example, the pop-up screen 2010 illustrated in FIG. 10) (S2204).

If the receiving part 712 determines that the selection for automatically switching the items has not been received (the "No" button 2012 has been pressed) (S2204: No), the output part 713 outputs a display screen including a waveform data field in which waveform data of each item in each of the two processes is represented in the selected step without switching the items (S2205).

In contrast, when the receiving part 712 determines that the selection for automatically switching the items has been received (the "Yes" button 2011 has been pressed) (S2204: Yes), the output part 713 switches the items to the items corresponding to the selected process, and outputs a display screen (for example, the display screen illustrated in FIG. 11) including a waveform data field in which waveform data of each switched item in each of the two processes is represented in the selected process (S2206).

When the output part 713 switches the items, if there are 5 items associated with the process, all the items are switched. However, when the number of items associated with the process is 4 or less, the output part 713 switches only 4 or less items and leaves the other items unswitched. In this case, the output part 713 may update the "ON" indicated in the channel field to "OFF" so that the waveform data is not displayed in the waveform data field.

The controller 700 according to the present embodiment displays a display screen including a waveform data field for each of the two processes. The display screen according to the present embodiment is not limited to the mode in which the waveform data fields are displayed for different processes, but may be displayed in a plurality of waveform data fields for the same process. When displaying a plurality of waveform data fields for the same process, the items to be displayed for each waveform data field may be the same or different.

According to the present embodiment, since the waveform data field for the two processes can be displayed, the user can easily visually compare the waveform data between the two processes. By this comparison, for example, it can be confirmed how the setting and performance of a given process affect other processes. By carrying out this confirmation, the appropriate setting can be grasped in each process, and the quality of the molded article can be improved.

In the above-described embodiment, a display screen on which items can be selected is displayed. Thus, the user can easily recognize the state of the process by selecting an item to be confirmed in each process. In such a display screen, when the user needs to set all items when the process change operation is performed, the user's operational burden increases. In contrast, in the above-described embodiment, by automatically switching to the item associated with the process, the user's operational burden to set the item suitable for the process can be reduced.

When waveform data is displayed in a waveform data field included in a display screen, scale information to be displayed is different for each item. Therefore, when the scale information can be arbitrarily set by the user, the user needs to set the scale information for each item, thereby increasing the user's operational burden.

In contrast, in the above-described embodiment, scale information is held for each item associated with the process. In the above-described embodiment, when the item is automatically switched, the scale information (for example, the maximum value of the Y-axis and the minimum value of the Y-axis) corresponding to the item is set. Thus, since waveform data corresponding to the item can be displayed without changing the scale information, visibility can be improved, thereby reducing the user's operational burden.

When a process change operation is performed, a pop-up screen is displayed to confirm whether the item is automatically switched to the item associated with the process. Thus, since the user can select whether the item is automatically switched, the item can be displayed according to the situation, thereby reducing the user's operational burden.

In the above-described embodiment, an example in which waveform data is displayed as an example of display information in which changes in setting information or performance values based on items are represented in a graph has been described. However, the above-described embodiment is not limited to the display of the waveform data, but may be a display in which the change of the setting information or the performance value is represented by a graph visible by the user.

Although embodiments of the injection molding machine according to the present invention have been described above, the present invention is not limited to the above-described embodiments. Various modifications, corrections, substitutions, additions, deletions, and combinations are possible within the scope of the claims. They also naturally fall within the technical scope of the present invention.

The invention claimed is:

1. A controller of an injection molding machine comprising:

a processor configured to:

store, in a process correspondence information storage part, information on items, at least one of the items being preliminarily associated with at least two of a plurality of different processes that are performed for injection molding in order, at least one of the items that are preliminarily associated with one of the at least two of the plurality of different processes being different from at least one of the items that are preliminarily associated with another one of the at least two of the plurality of different processes, said information on the item being displayed when one of the process corresponding to the item of the plurality of the different processes is selected, said information on the item indicating either setting information indicative of a setting of the process corresponding to the item or a performance value detected in the process corresponding to the item;

wherein the items include:

a first item to be displayed when displaying a first process of the plurality of different processes is stored in association with the first process before receiving an operation to display the first process, and a second item to be displayed when displaying a second process of the plurality of different processes is stored in association with the second process before receiving an operation to display the second process, said first item being different from the second item, and wherein, when an operation to display the first process is received, the processor displays the first item for the first process, and when an operation to display the second process is received, the processor displays the second item for the second process;

receive, after storing the information on the items in the process correspondence information storage part, a selection of one of the first process and the second process; and output display information that graphically represents changes in the setting information based on the item preliminarily associated with the process for which the selection was received when the processor receives the selection of the process, or display information that graphically represents changes in the performance value based on the item preliminarily associated with the process for which the selection was received when the processor receives the selection of the process, wherein each of the first process and the second process that is performed for injection molding is one of measuring process, mold closing process, pressure-boosting process, clamping process, filling process, pressure-holding process, cooling process, depressurization process, mold opening process, or ejection process.

2. The controller of an injection molding machine according to claim 1, wherein the processor is configured to output the display information according to the setting information displayed which is preliminary associated with each item, or scale information indicating a range for displaying the performance value.

3. The controller of an injection molding machine according to claim 1, wherein the processor is configured to output inquiry display information to inquire whether to switch to the item preliminarily associated with the selected injection molding process is received, and wherein the processor is configured to output the display information of the item preliminarily associated with the process for which the selection is received when the processor receives the selection for switching the item.

4. The controller of an injection molding machine according to claim 1, wherein the processor is configured to output a screen indicating the display information of the item preliminarily associated with the process to the display, in a different area of a screen display for each of a plurality of processes.

5. The controller of an injection molding machine according to claim 1, wherein the processor is configured to receive an operation to change the item preliminarily associated with the process, and wherein the processor is configured to output the display information of the item preliminarily associated with the process based on the change when the processor receives the selection of the process.

6. The controller of an injection molding machine according to claim 1, wherein the controller further comprises a storage medium configured to store, in association with each of the plurality of the injection processes, information of items to be displayed when the process is selected, and wherein the information of the items includes scale information indicating a maximum value and a minimum value to be displayed for each of the items.

7. The controller of an injection molding machine according to claim 1, wherein the information on the items includes information to specify each of the items and scale information that indicates a maximum value and a minimum value to be displayed for each of the items.

8. The controller of an injection molding machine according to claim 1, wherein the information on items that are stored in the process correspondence information storage part includes scale information indicating a range for displaying the performance value so as to associate the plurality of different processes with the items and the scale information, and the processor is configured to automatically output display information that graphically represents changes in the setting information based on the item and the scale information that are preliminarily associated with the process for which the selection was received when the processor receives the selection of the process, or display information that graphically represents changes in the performance value based on the item and the scale information that are preliminarily associated with the process for which the selection was received when the processor receives the selection of the process.

9. The controller of the injection molding machine according to claim 1, wherein the processor is further configured to output a screen so as to receive an instruction to automatically display the first item according to a selection of the first process or display the second item according to a selection of the second process.

10. An injection molding machine comprising:

a processor configured to:

store, in a process correspondence information storage part, information on items, at least one of the items being preliminarily associated with at least two of a plurality of different processes that are performed for injection molding in order, at least one of the items that are preliminarily associated with one of the at least two of the plurality of different processes being different from at least one of the items that are preliminarily associated with another one of the at least two of the plurality of different processes, said information on the item being displayed when one of the process corresponding to the item of the plurality of the different processes is selected, said information on the item indicating either setting information indicative of a setting of the process corresponding to the item or a performance value detected in the process corresponding to the item;

wherein the items include:

a first item to be displayed when displaying a first process of the plurality of different processes is stored in association with the first process before receiving an operation to display the first process, and a second item to be displayed when displaying a second process of the plurality of different processes is stored in association with the second process before receiving an operation to display the second process, said first item being different from the second item, and wherein, when an operation to display the first process is received, the processor displays the first item for the first process, and when an operation to display the second process is received, the processor displays the second item for the second process;

receive, after storing the information on the items in the process correspondence information storage part, a selection of the one of the first process and the second process; and output display information that graphically represents changes in the setting information based on the item preliminarily associated with the process for which the selection was received when the processor receives the selection of the process, or display information that graphically represents changes in the performance value based on the item preliminarily associated with the process for which the selection was received when the processor receives the selection of the process, wherein each of the first process and the second process that is performed for injection molding is one of measuring process, mold closing process, pressure-boosting process, clamping process, filling process, pressure-holding process, cooling process, depressurization process, mold opening process, or ejection process.

11. A recording medium configured to record a program for a computer to execute a process, comprising:

storing, in a process correspondence information storage part, information on items, at least one of the items being preliminarily associated with at least two of a plurality of different processes that are performed for injection molding in order, at least one of the items that are preliminarily associated with one of the at least two of the plurality of different processes being different from at least one of the items that are preliminarily associated with another one of the at least two of the plurality of different processes, said information on the item being displayed when one of the process corresponding to the item of the plurality of the different processes is selected, said information on the item indicating either setting information indicative of a setting of the process corresponding to the item or a performance value detected in the process corresponding to the item;

wherein the items include:

a first item to be displayed when displaying a first process of the plurality of different processes is stored in association with the first process before receiving an operation to display the first process, and a second item to be displayed when displaying a second process of the plurality of different processes is stored in association with the second process before receiving an operation to display the second process, said first item being different from the second item, and wherein, when an operation to display the first process is received, the processor displays the first item for the first process, and when an operation to display the second process is received, the processor displays the second item for the second process;

receiving, after storing the information on the items in the process correspondence information storage part, a selection of the one of the first process and the second process; and outputting display information that graphically represents changes in the setting information based on the item preliminarily associated with the process for which the selection was received when the processor receives the selection of the process, or display information that graphically represents changes in the performance value based on the item preliminarily associated with the process for which the selection was received when the processor receives the selection of the process, wherein each of the first process and the second process that is performed for injection molding is one of measuring process, mold closing process, pressure-boosting process, clamping process, filling process, pressure-holding process, cooling process, depressurization process, mold opening process, or ejection process.

\* \* \* \* \*